(12) United States Patent
Fisher et al.

(10) Patent No.: US 10,560,048 B2
(45) Date of Patent: Feb. 11, 2020

(54) PHOTOVOLTAIC ROOFING SYSTEMS WITH BOTTOM FLASHINGS

(71) Applicant: CertainTeed Corporation, Malvern, PA (US)

(72) Inventors: Christopher C. Fisher, Philadelphia, PA (US); Robert L. Jenkins, Honeybrook, PA (US); Robin M. Duarte, Newcastle, CA (US)

(73) Assignee: CertainTeed Corporation, Malvern, PA (US)

( * ) Notice: Subject to any disclaimer, the term of this patent is extended or adjusted under 35 U.S.C. 154(b) by 0 days.

(21) Appl. No.: 15/340,431

(22) Filed: Nov. 1, 2016

(65) Prior Publication Data

US 2017/0126171 A1    May 4, 2017

Related U.S. Application Data

(60) Provisional application No. 62/249,700, filed on Nov. 2, 2015.

(51) Int. Cl.
*H02S 20/25* (2014.01)

(52) U.S. Cl.
CPC .................... *H02S 20/25* (2014.12)

(58) Field of Classification Search
CPC .......... H02S 20/25; H02S 20/26; H02S 20/23; Y02B 10/12; E04D 13/14; E04D 13/1401; E04D 13/1415; E04D 13/147; E04D 13/1475; E04D 13/1478; E04D 13/15; E04D 13/155; E04D 13/158; E04D 13/031; E04D 13/0315; F24J 2/5245; F24J 2/5247; F24J 2/5249
See application file for complete search history.

(56) References Cited

U.S. PATENT DOCUMENTS

| | | | |
|---|---|---|---|
| 3,579,940 A | 5/1971 | Greenleaf | |
| 5,457,057 A | 10/1995 | Nath et al. | |
| 5,968,287 A | 10/1999 | Nath | |
| 6,370,828 B1 | 4/2002 | Genschorek | |
| 6,606,830 B2 | 8/2003 | Nagao | |
| 6,809,253 B2 | 10/2004 | Dinwoodie | |
| 7,003,922 B2 | 2/2006 | Fifield | |
| 7,012,188 B2 | 3/2006 | Erling | |
| 7,138,578 B2 | 11/2006 | Komamine | |
| 7,297,867 B2 | 11/2007 | Nomura | |
| 7,328,534 B2 | 2/2008 | Dinwoodie | |
| 7,915,519 B2 | 3/2011 | Kobayashi | |
| 8,141,306 B2 | 3/2012 | Masuda et al. | |
| 8,266,846 B2 | 9/2012 | Schoell | |

(Continued)

FOREIGN PATENT DOCUMENTS

CA    2794183 A1 *    5/2013    ............. H02S 20/23

OTHER PUBLICATIONS

Declaration of Christoper C. Fisher signed Dec. 27, 2017.

*Primary Examiner* — Jessica L Laux
(74) *Attorney, Agent, or Firm* — McDonnell Boehnen Hulbert & Berghoff LLP

(57) ABSTRACT

The present disclosure relates particularly to photovoltaic roofing systems for use in photovoltaically generating electrical energy, specifically, the use of bottom flashings in such systems. Methods for installing such systems and replacing non-photovoltaic roofing elements in such systems are also described.

14 Claims, 13 Drawing Sheets

(56) References Cited

U.S. PATENT DOCUMENTS

| | | |
|---|---|---|
| 8,601,754 B2 | 12/2013 | Jenkins et al. |
| 8,631,614 B2 | 1/2014 | Livsey et al. |
| 8,776,456 B1* | 7/2014 | Schrock ................. F24J 2/5245 126/623 |
| 8,959,848 B2 | 2/2015 | Jenkins et al. |
| 9,032,672 B2 | 5/2015 | Livsey et al. |
| 9,270,224 B2 | 2/2016 | Livsey et al. |
| 9,755,573 B2 | 9/2017 | Livsey et al. |
| 9,806,668 B2* | 10/2017 | Johansen ................. H02S 20/25 |
| 2002/0043031 A1 | 4/2002 | Eguchi |
| 2006/0196128 A1 | 9/2006 | Duke |
| 2008/0000173 A1* | 1/2008 | Lenox ................. F24J 2/5245 52/173.1 |
| 2008/0289272 A1 | 11/2008 | Flaherty et al. |
| 2008/0302030 A1 | 12/2008 | Stancel et al. |
| 2008/0313976 A1 | 12/2008 | Allen |
| 2009/0019795 A1 | 1/2009 | Szacsvay |
| 2010/0065108 A1 | 3/2010 | West et al. |
| 2010/0132274 A1 | 6/2010 | Reyal |
| 2010/0192505 A1* | 8/2010 | Schaefer ................. A47B 96/14 52/653.2 |
| 2010/0236162 A1 | 9/2010 | Tweedie |
| 2010/0242381 A1* | 9/2010 | Jenkins ................. H02S 20/23 52/173.3 |
| 2010/0313499 A1 | 12/2010 | Gangemi |
| 2011/0083381 A1 | 4/2011 | David et al. |
| 2011/0302857 A1 | 12/2011 | McClellan |
| 2011/0302859 A1 | 12/2011 | Crasnianski |
| 2012/0137600 A1 | 6/2012 | Jenkins |
| 2012/0186630 A1 | 7/2012 | Jenkins et al. |
| 2012/0204927 A1* | 8/2012 | Peterson ................. H01L 31/048 136/244 |
| 2012/0240490 A1 | 9/2012 | Gangemi |
| 2015/0326170 A1 | 11/2015 | Livsey et al. |

* cited by examiner

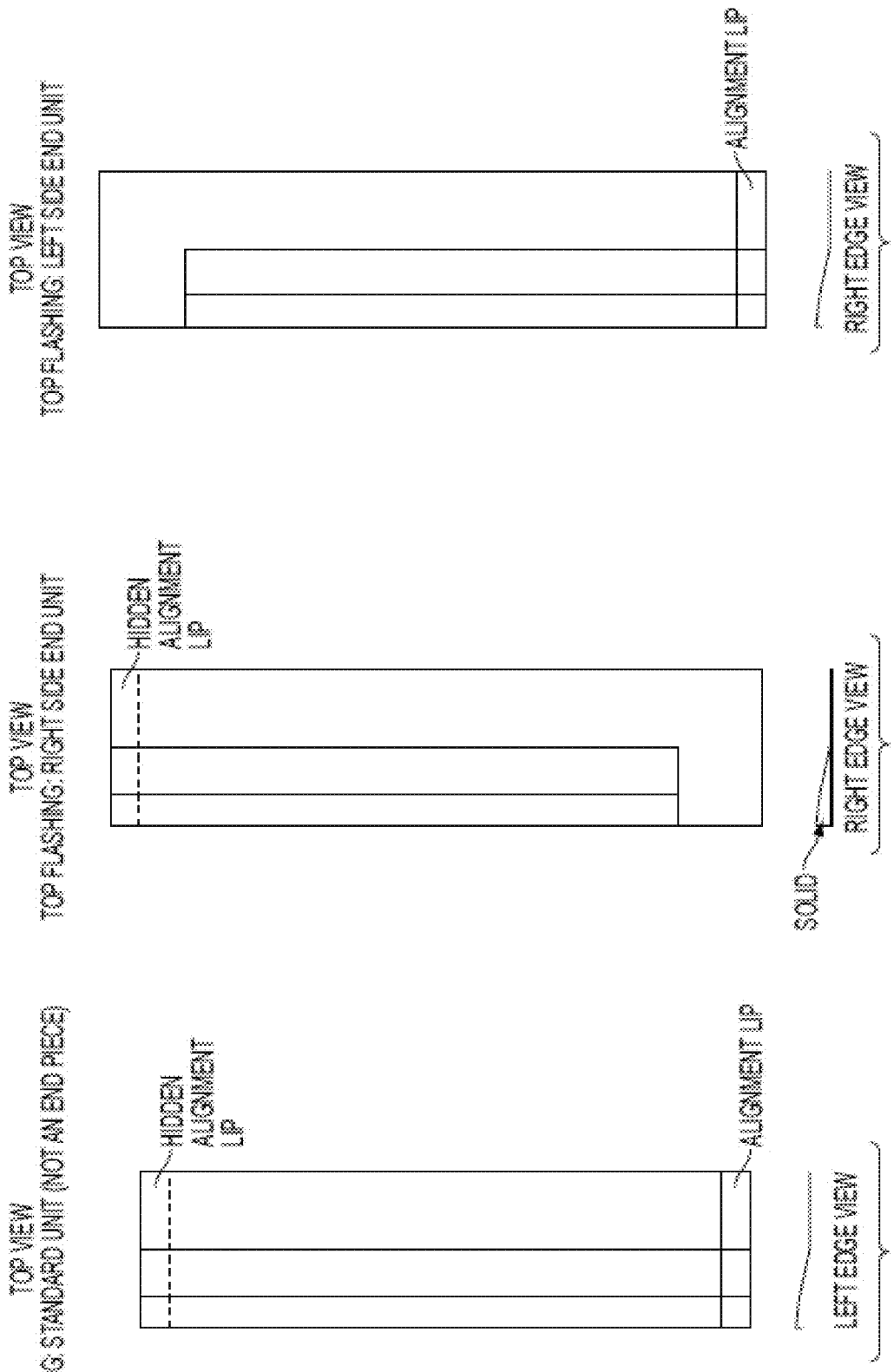

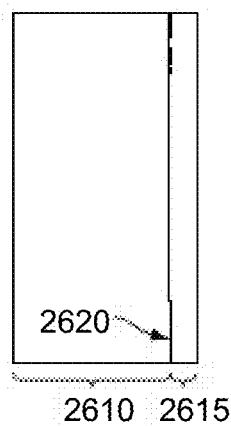
2680
2620
2610 2615
TOP VIEW
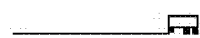
BACK VIEW
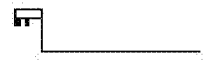
FRONT VIEW
SIDE VIEW
FIG. 26

PHOTOVOLTAIC ROOFING SYSTEMS WITH BOTTOM FLASHINGS

CROSS-REFERENCE TO RELATED APPLICATIONS

This application claims the benefit of priority of U.S. Provisional Patent Application No. 62/249,700, filed Nov. 2, 2015, which is hereby incorporated herein by reference in its entirety.

BACKGROUND OF THE DISCLOSURE

1. Field of the Disclosure

The present disclosure relates generally to the photovoltaic generation of electrical energy. The present disclosure relates more particularly to photovoltaic roofing products for use in photovoltaically generating electrical energy.

2. Technical Background

The search for alternative sources of energy has been motivated by at least two factors. First, fossil fuels have become increasingly expensive due to increasing scarcity and unrest in areas rich in petroleum deposits. Second, there exists overwhelming concern about the effects of the combustion of fossil fuels on the environment due to factors such as air pollution (from $NO_x$, hydrocarbons and ozone) and global warming (from $CO_2$). In recent years, research and development attention has focused on harvesting energy from natural environmental sources such as wind, flowing water, and the sun. Of the three, the sun appears to be the most widely useful energy source across the continental United States; most locales get enough sunshine to make solar energy feasible.

Accordingly, there are now available components that convert light energy into electrical energy. Such "photovoltaic cells" are often made from semiconductor-type materials such as doped silicon in either single crystalline, polycrystalline, or amorphous form. The use of photovoltaic cells on roofs is becoming increasingly common, especially as system performance has improved. They can be used, for example, to provide at least a significant fraction of the electrical energy needed for a building's overall function; or they can be used to power one or more particular devices, such as exterior lighting systems and well pumps.

Accordingly, research and development attention has turned toward the development of photovoltaic products that are adapted to be installed on a roof. While stand-alone photovoltaic modules have been in use for some time, they tend to be heavy and bulky, and aesthetically unfavorable when installed on a roof. Roofing products having photovoltaic cells integrated with roofing products such as shingles, shakes or tiles, or roofing panels have been proposed. Examples of such proposals have been disclosed in U.S. Patent Application Publications nos. 2006/0042683A1, 2008/0149163A1, 2010/0313499A1 and 2010/0313501A1, and in U.S. Pat. No. 4,040,867, each of which is hereby incorporated by reference herein in its entirety. A plurality of such photovoltaic roofing elements (i.e., including photovoltaic media integrated with a roofing product) can be installed together on a roof, and electrically interconnected to form a photovoltaic roofing system that provides both environmental protection and photovoltaic power generation. These can be very advantageous, but can be difficult to install on steep surfaces, while ensuring sufficient closure of the roof against the elements, particularly wind driven rain, and can often result in incomplete coverage of the roof surface with photovoltaic power generation. Moreover, as it is often desirable to have photovoltaic roofing elements covering a portion of a roof surface and conventional roofing products covering the remainder of the surface, there is a need for systems that provide aesthetic effect in the transition zone between the conventional roofing products and the photovoltaic roofing elements while closing the roof and the array of photovoltaic roofing elements to the environment.

Photovoltaic roofing systems are often installed together with a conventional roof covering (i.e., of non-photovoltaic roofing elements) such that rows of the various elements disposed toward the top end of the roof deck overlap rows disposed more toward the bottom end of the roof deck. In such an arrangement, the bottom row of photovoltaic roofing elements would typically overlap the headlap zones of the non-photovoltaic roofing elements immediately down-roof as such, in such installations, the non-photovoltaic roofing elements toward the bottom end of the roof deck must typically be installed on the roof before the photovoltaic roofing elements. This can be especially complicated in installations in which non-photovoltaic roofing elements are to be installed to overlap flashings associated with the photovoltaic roofing elements, as it would require non-photovoltaic roofing elements to be installed both before and after installation of the photovoltaic roofing elements. Moreover, replacement of the non-photovoltaic roofing elements disposed under the bottom row of photovoltaic roofing elements (e.g., as part of re-covering the roof with new shingles) can be complicated by the fact that the fasteners affixing them to the roof deck are covered by the photovoltaic roofing elements.

There remains a need for photovoltaic products that address one or more of these deficiencies.

SUMMARY OF THE DISCLOSURE

One aspect of the disclosure is a photovoltaic roofing system disposed on a roof deck having a top end, a bottom end, a first lateral side and a second lateral side opposing the first lateral side, the photovoltaic roofing system including:
  a plurality of photovoltaic roofing elements, contiguously disposed on the roof deck, the contiguously-disposed plurality of photovoltaic roofing elements defining a bottom edge, the contiguously-disposed roofing elements including one or more bottom end photovoltaic roofing elements disposed at the bottom edge thereof, each of the bottom end photovoltaic roofing elements having a bottom end;
  one or more bottom flashing elements disposed along the bottom edge of the contiguously-disposed plurality of photovoltaic roofing elements, each of the one or more bottom flashing elements having an upward-facing surface, a top end and a bottom end, and a first lateral end and a second lateral end, the top end of each of the one of more bottom flashing elements being substantially disposed under at least one of the bottom end photovoltaic roofing elements at the bottom end thereof such that the bottom end of each of the one or more bottom flashing elements protrudes beyond the bottom edge of the contiguously-disposed photovoltaic roofing elements; and
  one or more non-photovoltaic roofing elements disposed along the bottom end of the one or more bottom flashing elements, each non-photovoltaic roofing element having an exposure zone at a bottom end thereof and a headlap zone at a top end thereof, the headlap zone of each non-photovoltaic roofing element being disposed under one or more of the bottom end flashing elements at the bottom end thereof.

In certain embodiments, each of the one or more bottom flashing elements includes a top end piece having a top end forming the top end of the bottom flashing element; and a bottom end piece having a bottom end forming the bottom end of the bottom flashing element.

Another aspect of the disclosure is method for installing a photovoltaic roofing system as described herein on a roof deck having a top end and a bottom end, the method including disposing the plurality of photovoltaic roofing elements, the one or more bottom flashing elements and the one or more non-photovoltaic roofing elements to provide the photovoltaic roofing system.

BRIEF DESCRIPTION OF THE DRAWINGS

The accompanying drawings are not necessarily to scale, and sizes of various elements can be distorted for clarity.

FIGS. 23, 24 and 25 are top schematic views and edge schematic views of examples of top flashing elements for closing the top portion of the array of photovoltaic roofing elements according to one embodiment of the disclosure;

FIGS. 26 and 27 are sets of schematic views (top, back, side, front and perspective) of lateral edge flashing elements suitable for use in certain embodiments of the disclosure.

DETAILED DESCRIPTION

Photovoltaic roofing systems can be formed from a plurality of photovoltaic roofing elements disposed contiguously on a roof deck, and flashed into a field of conventional roofing materials. Examples of such systems are described, for example, in U.S. Pat. Nos. 8,631,614, 8,601,754 and 8,898,970 and U.S. Patent Application no. 2014/0102518, each of which is hereby incorporated herein by reference in its entirety for all purposes. The person of ordinary skill in the art will appreciate that the photovoltaic roofing systems described herein can be further configured in any manner described in the above-referenced applications.

Figure 1:
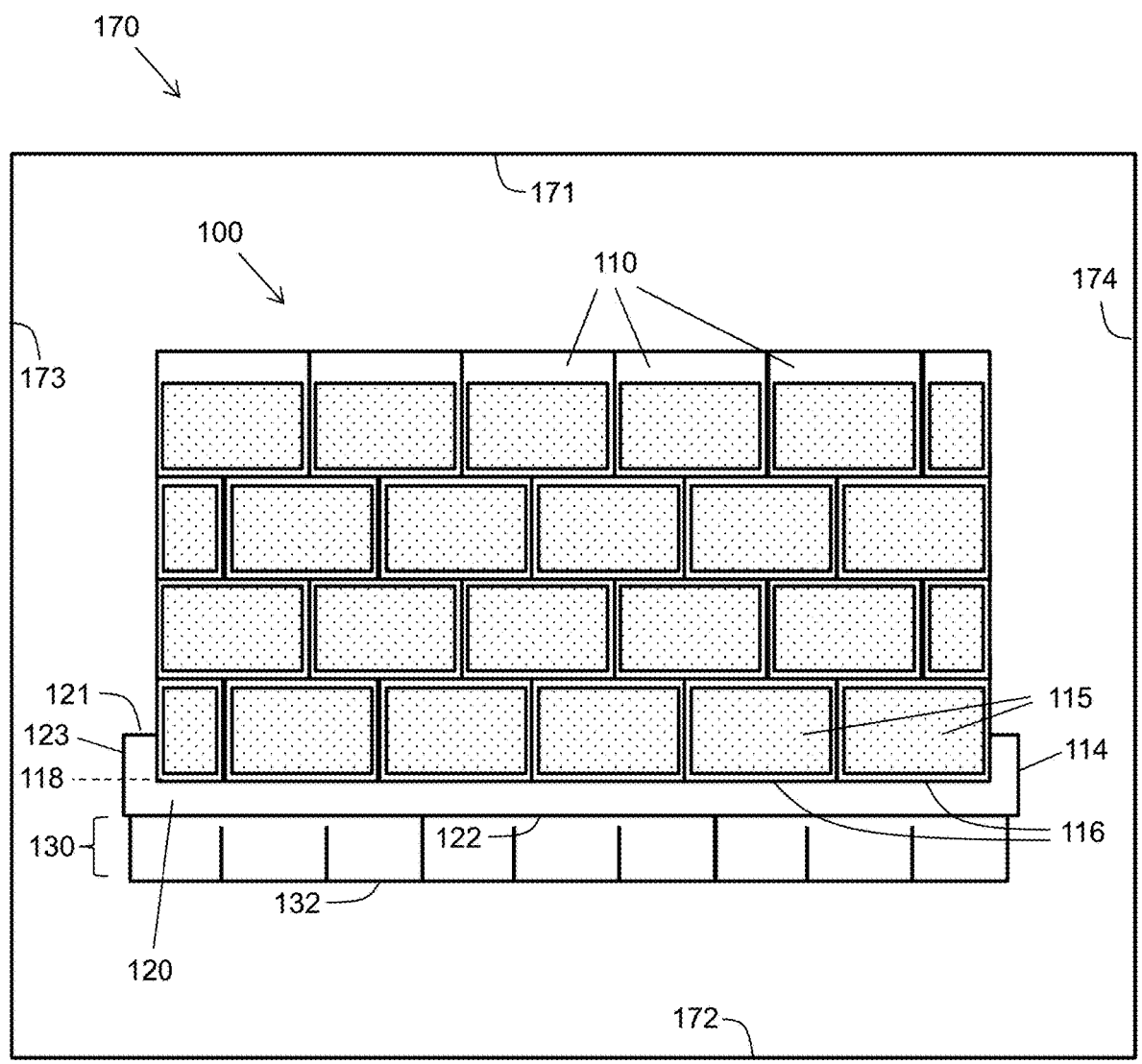
FIG. 1 is a schematic plan view.
Figure 2:
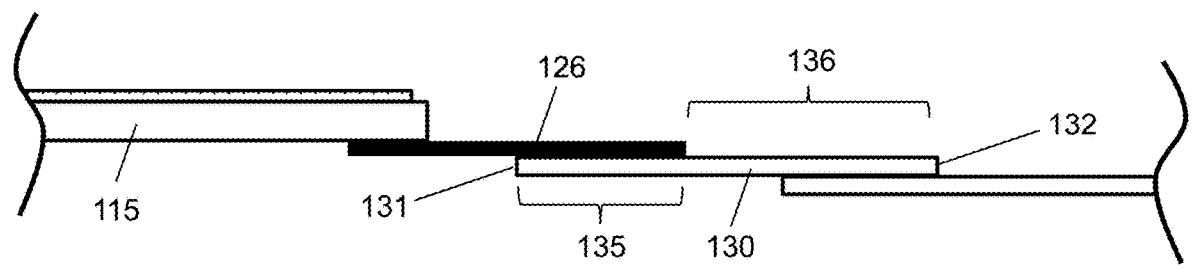
FIG. 2 is a schematic cross-sectional view of a photovoltaic roofing system according to one embodiment of the disclosure.

FIG. 1 is a schematic plan view, and FIG. 2 is a schematic cross-sectional view of a photovoltaic roofing system according to one embodiment of the disclosure. A roof deck 170 has a top end 171, a bottom end 172, a first lateral side 173 and a second lateral side 174 opposing the first lateral side. As used herein with reference to other elements, the terms "top," "bottom," "first lateral" and ":second lateral" refer to an end of an element that is disposed generally toward the corresponding end or side of the roof deck. For example, the bottom end of a bottom flashing element is the end that is disposed generally toward the bottom end of the roof deck (i.e., as compared to the other ends of the bottom flashing element).

Photovoltaic roofing system 100 is disposed on roof deck 170. The photovoltaic roofing system includes a plurality of photovoltaic roofing elements 110, contiguously disposed on the roof deck 170. The photovoltaic roofing elements can be, for example, as described in any of U.S. Pat. Nos. 8,631,614, 8,601,754 and 8,898,970 and U.S. Patent Application no. 2014/0102518, each of which is hereby incorporated herein by reference in its entirety. The contiguously-disposed roofing elements define a bottom edge 118, and include disposed at the bottom edge 118 one or more bottom end photovoltaic roofing elements 115. Each of the bottom end photovoltaic roofing elements 115 has a bottom end 116.

Photovoltaic roofing system 100 also includes one or more bottom flashing elements 120 disposed along the bottom edge 118 of the contiguously-disposed plurality of photovoltaic roofing elements, each of the one or more bottom flashing elements having an upward-facing surface 126, a top end 121 and a bottom end 122, and a first lateral end 123 and a second lateral end 124. The top end 121 of each of the one of more bottom flashing elements 120 is substantially disposed under at least one of the bottom end photovoltaic roofing elements 115 at the bottom end 116 thereof such that the bottom end 122 of each of the one or more bottom flashing elements 120 protrudes beyond the bottom edge 118 of the contiguously-disposed photovoltaic roofing elements.

The photovoltaic roofing system further includes one or more non-photovoltaic roofing elements 130 disposed along the bottom end 122 of the one or more bottom flashing elements. Each non-photovoltaic roofing element 130 has an exposure zone 136 at a bottom end 132 thereof and a headlap zone 135 at a top end 131 thereof. The headlap zone of each non-photovoltaic roofing element is disposed under one or more of the bottom end flashing elements at the bottom end thereof.

In certain embodiments of the photovoltaic roofing systems as described herein, each bottom flashing element is generally linear, extending from the first lateral end thereof to the second lateral end thereof. That is, each bottom flashing element is substantially longer (e.g., at least a 5:1 ratio) in the direction extending from the first lateral end to the second lateral end.

The person of ordinary skill in the art will appreciate that the bottom flashing of the system can be provided as a single laterally-extending piece (e.g., spanning the width of the bottom edge of the continuously-disposed photovoltaic elements). In other embodiments, the bottom flashing of the system is provided as a plurality of laterally-overlapping bottom flashing elements. The lateral overlap between adjacent flashing elements can be, for example, in the range of about 2 inches to about 6 inches, e.g., about 4 inches. The person of ordinary skill in the art will appreciate that the bottom flashing elements can be less than, equal to, or greater in length than the photovoltaic roofing element(s), and can be arranged in registration with, or alternatively not in registration with, the photovoltaic roofing element(s).

As noted above, the top end of each of the one or more bottom flashing elements is substantially disposed under at least one of the bottom end photovoltaic roofing elements 115 at the bottom end 116 thereof. That is, the top end of each of the one or more bottom flashing elements need not be completely overlapped by the photovoltaic roofing elements. Rather, in certain embodiments the first lateral end of the top end of the bottom flashing element disposed toward the first lateral side of the roof deck may not be overlapped by the photovoltaic roofing elements, as shown in FIG. 1. Similarly, in certain embodiments the second lateral end of the top end of the bottom flashing element disposed toward the second lateral side of the roof deck may not be overlapped by the photovoltaic roofing elements, as shown in FIG. 1. In certain such embodiments, the first end and/or the second end of the respective bottom flashing element(s) are overlapped by a side flashing element. Side flashing elements are described in the patents and patent application publication referenced above.

As described above, and as shown in FIG. 1, the bottom end of each of the one or more bottom flashing elements protrudes beyond the bottom edge of the contiguously-disposed photovoltaic roofing elements. For example, in certain embodiments, the bottom end of each of the one or more bottom flashing elements protrudes beyond the bottom edge of the contiguously-disposed photovoltaic roofing elements by at least about two inches, at least about three inches, or at least about four inches, for example, in the range of about two inches to about ten inches, about three inches to about ten inches, about four inches to about ten inches, about two inches to about six inches, about three inches to about six inches, or about four inches to about eight inches.

The bottom end flashing elements can be formed in a variety of sizes. For example, one or more of the one or more bottom flashing elements can have a length (i.e., from the first lateral end to the second lateral end thereof) of at least about 18 inches, at least about 24 inches, or at least about 30 inches, for example, in the range of about 18 inches to about 54 inches, about 24 inches to about 54 inches, about 30 inches to about 54 inches, about 18 inches to about 42 inches, about 24 inches to about 42 inches, or about 30 inches to about 48 inches. Of course, the person of ordinary skill in the art will understand that in certain such embodiments one or more of the one or more bottom flashing elements is substantially shorter in length than the other bottom flashing elements (e.g., substantially shorter than 18 inches in length), for example, to provide the appropriate length for the overall bottom flashing or to provide the ends of the bottom flashing with particular features or finish.

In certain embodiments, the width (i.e., from the top end to the bottom end) of the one or more bottom flashing elements is at least about three inches, at least about five inches, or at least about seven inches, for example, in the range of about three inches to about 24 inches, about five inches to about 24 inches, about seven inches to about 24 inches, about three inches to about 18 inches, about five inches to about 28 inches, or about seven inches to about 21 inches.

The one or more bottom flashing elements can be formed from a variety of materials. For example, in certain advantageous embodiments, the one or more bottom flashing elements are formed from a substantially rigid material, such as a polymer, a composite or a metal. Suitable materials include, for example, aluminum, copper, galvanized steel or iron, hard polymers, polymer composites, and carbon fiber- or fiberglass-reinforced materials. Of course, the person of ordinary skill in the art will appreciate that it may be desirable to be able to flex the material of the bottom flashing element in order to lift it up from the roof to access the non-photovoltaic roofing material disposed underneath. Accordingly, in certain embodiments the material of the bottom flashing element(s) is resiliently deformable (e.g., as a relatively thin rigid sheet metal). In certain embodiments, the one or more bottom end flashing elements are relatively thin, e.g., less than about 3 mm in thickness, or even less than about 2 mm in thickness in the region in which the one or more bottom edge photovoltaic roofing element(s) are disposed thereon.

Figure 3:
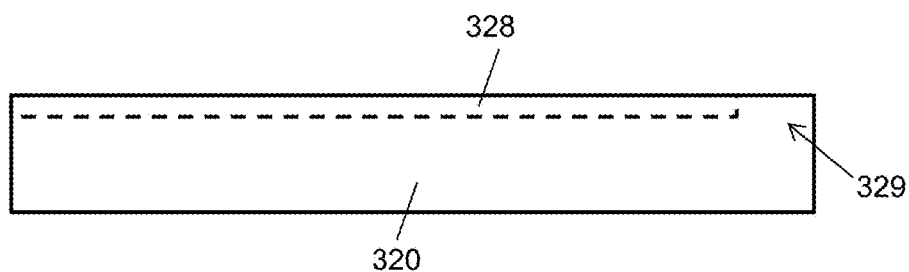
FIG. 3 is a schematic plan view.
Figure 4:
FIG. 4 is a cross-sectional view of a bottom flashing element according to one embodiment of the disclosure.

In order to provide additional rigidity and stability to the one or more bottom flashing elements, it may be desirable to include a return hem at one or more of the top ends or the bottom ends thereof. A return hem is formed as one or more folded-over, or, preferably, folded-under pieces of material. The return hem can be, for example, in the range of ¼" to 2", e.g., ¼" to 1" or ¼" to ¾" in width (as measured from the top end to the bottom end thereof. The return hem desirably spans a substantial part (e.g., at least 80% or even at least 90%) of the length of a bottom flashing element (i.e., as measured from the first lateral end to the second lateral end thereof). In certain embodiments, no return hem is provided at the end of a bottom flashing element, to provide a space for an underlapping (for a folded-under hem) or overlapping (for a folded-over hem). FIG. 3 is a schematic plan view, and FIG. 4 is a cross-sectional view of a bottom flashing element according to one embodiment of the disclosure. Bottom flashing element 320 includes a folded-under return hem 328. Notably, the return hem 328 does not extend all the way to one end of the bottom flashing element, leaving room for an underlapping bottom flashing element. The person of ordinary skill in the art will appreciate that a return hem can in certain embodiments be provided on the top end of the bottom flashing element. In certain embodiments, a return hem is provided on the bottom end of the bottom flashing element.

In certain embodiments, the one or more non-photovoltaic roofing elements disposed along the bottom end of the one or more bottom flashing elements are affixed to the roof deck by one or more fasteners, and the one or more fasteners are not overlapped by any of the photovoltaic roofing elements.

Accordingly, in use, the bottom flashing element(s) can be moved (e.g., by lifting) to access the fasteners and thus remove or replace a non-photovoltaic roofing element.

In certain embodiments, each of the one or more bottom flashing elements is formed as a unitary piece. Such embodiments can allow for simple fabrication and installation of the bottom flashing elements.

However, in certain advantageous embodiments, each of the one or more bottom flashing elements is formed as a plurality of pieces, e.g., two pieces. For example, in certain embodiments, each of the one or more bottom flashing elements includes a top end piece having a top end forming the top end of the bottom flashing element, and a bottom end piece having a bottom end forming the bottom end of the bottom flashing element. The top end piece can, for example, be affixed to the bottom end piece in any convenient manner.

In certain advantageous embodiments, the bottom end piece of each bottom end flashing element is configured to be removable from the system separate from the top end piece thereof of the bottom end flashing element. In such embodiments, the one or more fasteners for the one or more non-photovoltaic roofing elements disposed along the bottom end of the one or more bottom flashing elements can be disposed under the bottom end piece(s) of the bottom flashing element(s). Accordingly, the bottom end piece(s) of the bottom flashing element(s) can be removed to allow access to the fastener(s) so that the non-photovoltaic roofing elements can be removed, e.g., to be replaced with new roofing materials. In certain advantageous embodiments, the one or more bottom photovoltaic roofing elements do not extend to the bottom piece(s) of the bottom flashing element(s), and so the bottom piece(s) of the bottom flashing element(s) can be removed without disturbing the photovoltaic roofing element(s).

In certain such embodiments, the top end piece is removably attached to the bottom end piece. The person of ordinary skill in the art will appreciate that a variety of mechanisms can be used to removably attach the pieces, e.g., a snap fit, an adhesive, Velcro, a tie, a frog, etc.

In other embodiments, the top end piece and the bottom end piece have interlocking features configured to hold them in position relative to one another, but are not attached to one another. For example, in certain embodiments, each of the one or more bottom flashing elements comprises a top end piece having a top end forming the top end of the bottom flashing element and a bottom end, the top end piece comprising at its bottom end one or more folded-under sections of material; and a bottom end piece having a bottom end forming the bottom end of the bottom flashing element, the bottom end piece comprising at its top end one or more folded-over sections of material, wherein the one or more folded-under sections of material of the top end piece interlock with the one or more folded-over sections of material of the bottom end piece.

Figure 5:
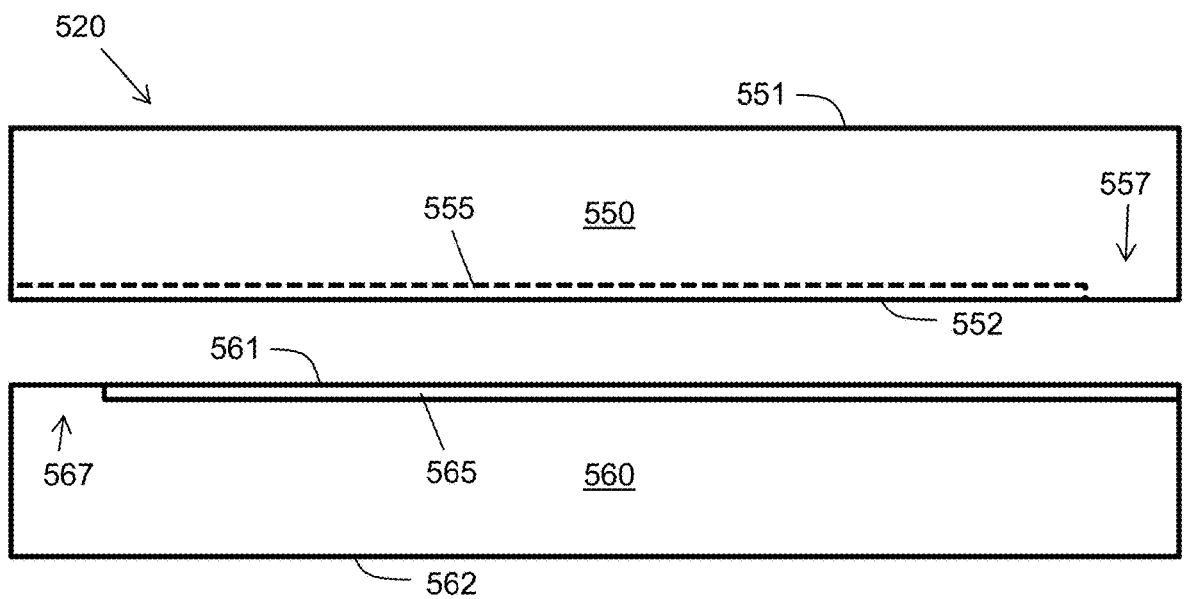
FIG. 5 is an exploded schematic plan view.
Figure 6:
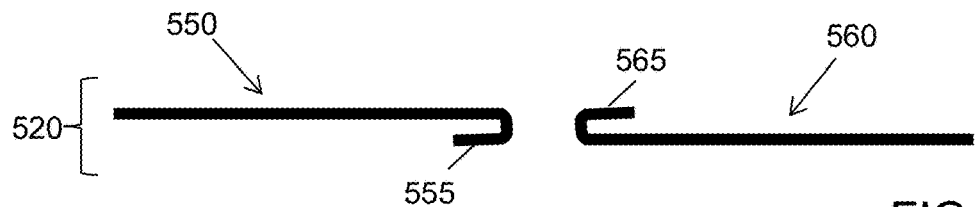
FIG. 6 is an exploded cross-sectional view.
Figure 7:
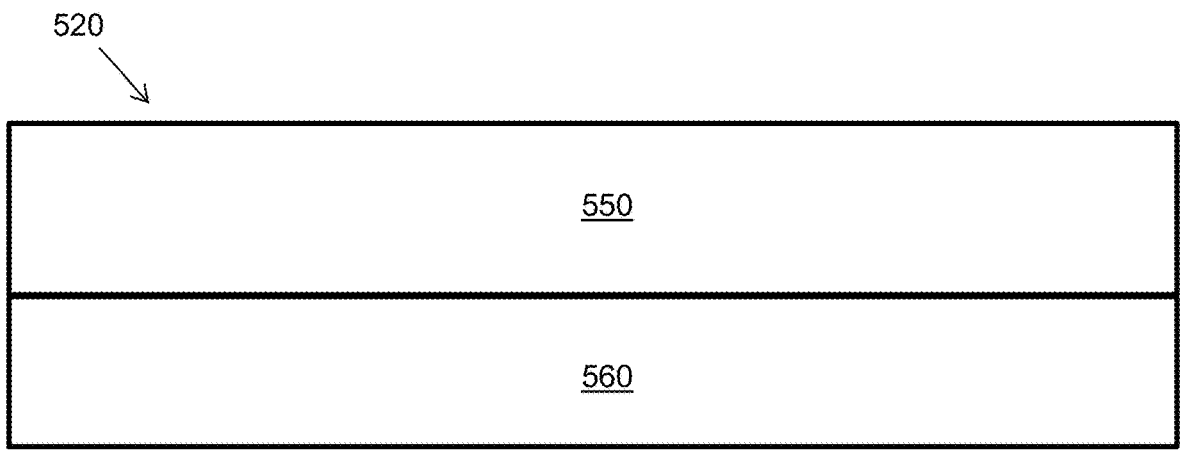
FIG. 7 is an assembled schematic plan view.
Figure 8:
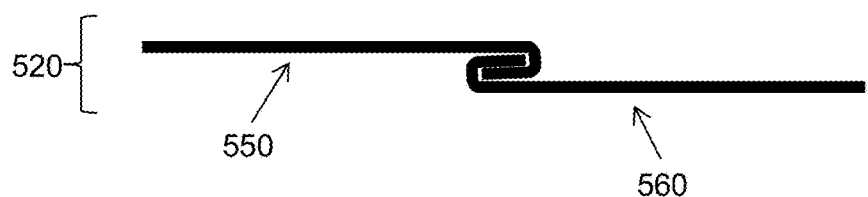
FIG. 8 is an assembled cross-sectional view of a bottom flashing element suitable for use in certain embodiments of the photovoltaic roofing systems of the disclosure.

Such an embodiment is shown in exploded schematic plan view in FIG. 5, in exploded cross-sectional view in FIG. 6, in assembled schematic plan view in FIG. 7, and in assembled cross-sectional view in FIG. 8. Bottom flashing element 520 includes a top end piece 550 and a bottom end piece 560. The top end piece has a top end 551 forming the top end of the bottom flashing element. The top end piece includes, at its bottom end 552, one or more (here, one) folded-under sections of material 555 (indicated by the dotted line in FIG. 5). The bottom end piece 560 has a bottom end 562 forming the bottom end of the bottom flashing element. The bottom end piece also includes at its top end 561 one or more (here, one) folded-over sections of material 565. Notably, when assembled as shown in FIGS. 7 and 8, the folded-under section of material of the top end piece and the folded-over section of material of the bottom piece interlock with one another so as to hold them in position relative to one another without being attached to one another. Specifically, in the embodiment of FIGS. 7 and 8, the folded-under material of the top end piece is disposed substantially between the folded-over material of the bottom end piece and the remainder of the bottom end piece, and the folded-over material of the bottom end piece is disposed substantially between the folded-under material of the top end piece and the remainder of the top end piece.

The widths (i.e., as measured from the top end to bottom end) of the folded-under material and the folded-over material can be selected by the person of ordinary skill in the art in view of the description herein. For example, in certain embodiments, the width of the folded-under material is in the range of about ¼" to about 3", about ⅜" to about 2", about ⅜" to about 1", about ½" to about 2" or about ½" to about 1". In certain embodiments, the width of the folded-over material is in the range of about ¼" to about 3", about ⅜" to about 2", about ⅜" to about 1", about ½" to about 2" or about ½" to about 1".

The widths (i.e., as measured from the top end to bottom end thereof) of the top end piece and the bottom end piece can likewise be selected by the person of ordinary skill in the art in view of the description herein. For example, in certain embodiments, the width of the top end piece is in the range of about 2" to about 12", about 3" to about 12", about 4" to about 12", about 2" to about 8", about 3" to about 8" or about 4" to about 8". In certain embodiments, the width of the bottom end piece is in the range of about 2" to about 12", about 3" to about 12", about 4" to about 12", about 2" to about 6", about 3" to about 6" or about 4" to about 6".

In FIGS. 6 and 8, the folded-over and folded-under sections of material are shown as being folded to be substantially parallel with the remainder of the respective flashing piece. As the person of ordinary skill in the art will appreciate, the folded-over or folded-under sections of material need not be folded to such an extent; folding to any acute angle (e.g., less than about 45 degrees, less than about 30 degrees, less than about 20 degrees or even less than about 15 degrees) can in many embodiments provide reasonable interlocking. In certain embodiments, the folded-over and/or folded-under sections are folded at an angle in the range of about 45 degrees to about 5 degrees, or about 35 degrees to about 15 degrees.

In certain embodiments, and as shown in FIG. 5, the one or more folded-under sections of material do not extend fully to one of the ends of the top end piece (as indicated by reference numeral 557), and/or the one or more folded-over sections of material do not extend fully to one of the ends of the bottom end piece (as indicated by reference numeral 567). As the person of ordinary skill in the art will appreciate in view of the description herein, this can help to allow adjacent bottom flashing elements to overlap one another.

Figure 9:
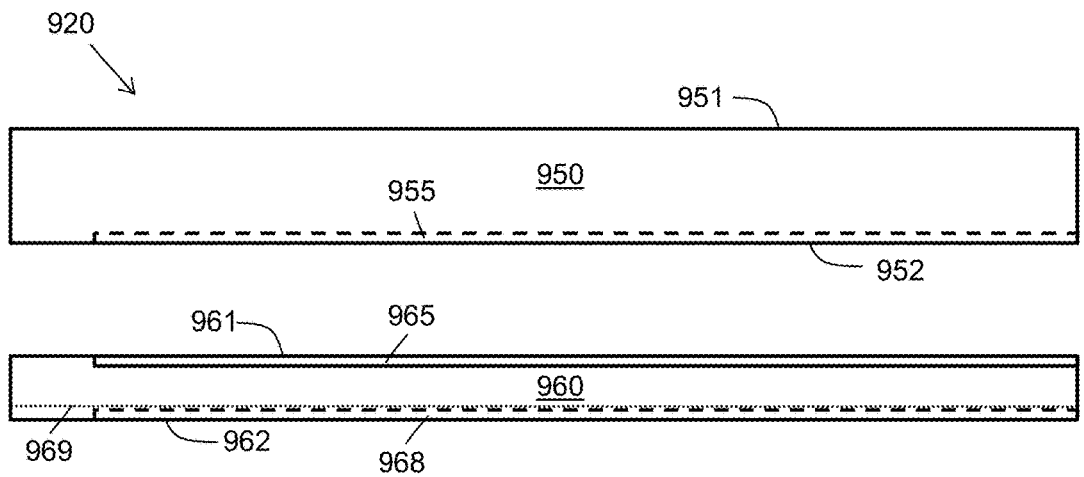
FIG. 9 is an exploded schematic plan view.
Figure 10:
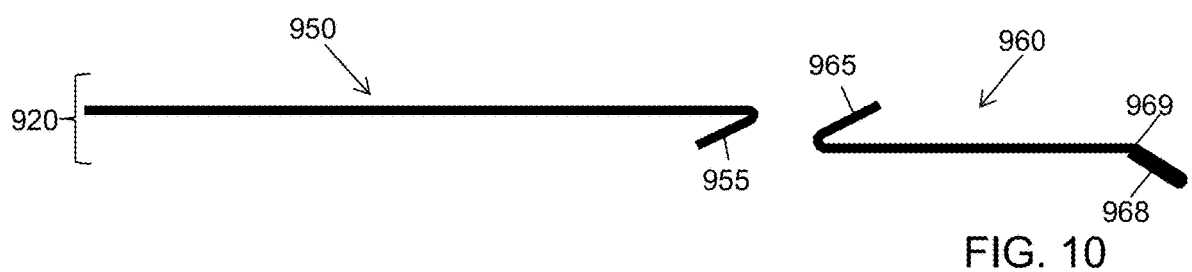
FIG. 10 is an exploded cross-sectional view.
Figure 11:
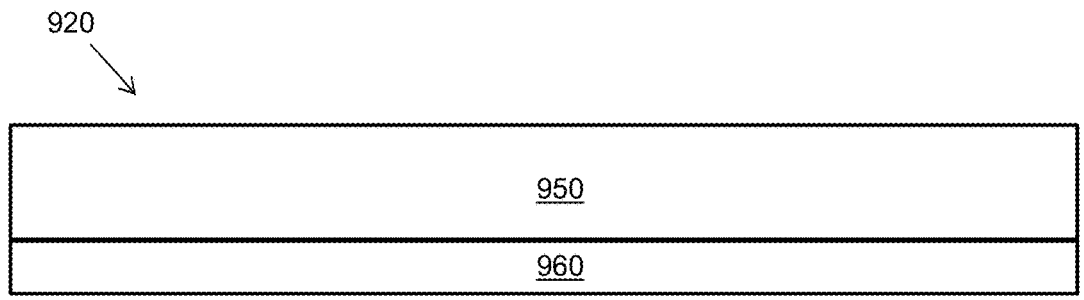
FIG. 11 is an assembled schematic plan view.
Figure 12:
FIG. 12 is an assembled cross-sectional view of another bottom flashing element suitable for use in certain embodiments of the photovoltaic roofing systems of the disclosure.

Another embodiment of a bottom flashing element is shown in exploded schematic plan view in FIG. 9, in exploded cross-sectional view in FIG. 10, in assembled schematic plan view in FIG. 11, and in assembled cross-sectional view in FIG. 12. Bottom flashing element 920 includes a top end piece 950 and a bottom end piece 960. The top end piece has a top end 951 forming the top end of the bottom flashing element. The top end piece includes, at its bottom end 952, one or more (here, one) folded-under sections of material 955 (indicated by the dotted line in FIG.

9). The bottom end piece 960 has a bottom end 962 forming the bottom end of the bottom flashing element. The bottom end piece also includes at its top end 961 one or more (here, one) folded-over sections of material 965. Notably, when assembled as shown in FIGS. 11 and 12, the folded-under section of material of the top end piece and the folded-over section of material of the bottom piece interlock with one another so as to hold them in position relative to one another without being attached to one another. Specifically, in the embodiment of FIGS. 11 and 12, the folded-under material of the top end piece is disposed substantially between the folded-over material of the bottom end piece and the remainder of the bottom end piece, and the folded-over material of the bottom end piece is disposed substantially between the folded-under material of the top end piece and the remainder of the top end piece.

In certain embodiments, and as shown in FIGS. 10 and 12, the bottom end of the bottom end piece is bent back (i.e., towards the roof deck) at an obtuse angle, e.g., at an angle of at least about 125 degrees, at least about 135 degrees, or at least about 145 degrees, e.g., in the range of about 125 degrees to about 165 degrees, or about 135 to about 155 degrees. The width of the bent-back portion can be, e.g., in the range of about ¼" to about 2", e.g., about ⅜" to about 1". The line of the fold is denoted by reference numeral 969 in FIGS. 9 and 10. The bent-back portion can include a return hem, e.g., as indicated by reference numeral 968 in FIGS. 9 and 10.

Figure 13:
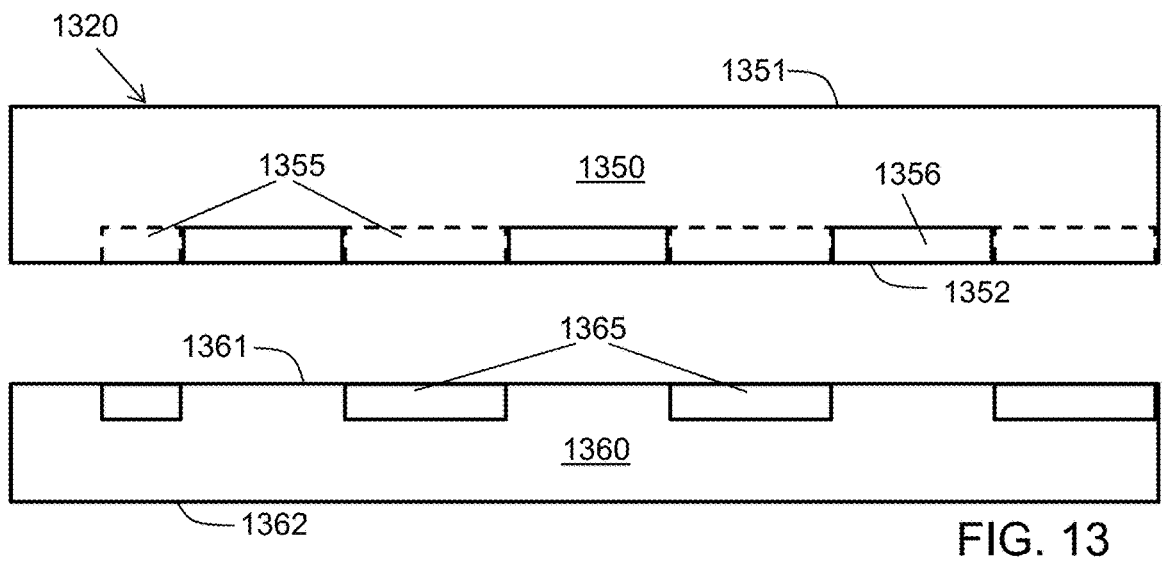
FIG. 13 is an exploded schematic plan view.
Figure 14:
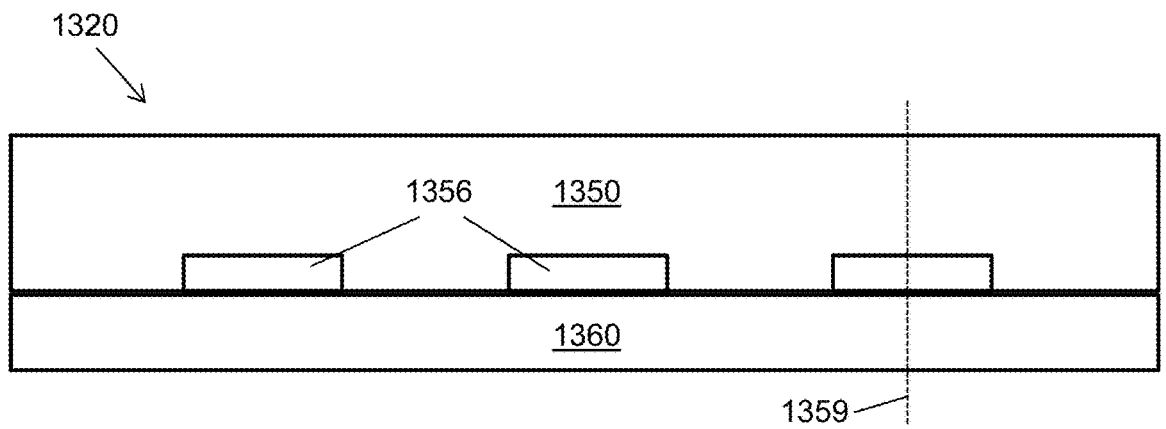
FIG. 14 is an assembled schematic plan view.
Figure 15:
FIG. 15 is an assembled cross-sectional view of another bottom flashing element suitable for use in certain embodiments of the photovoltaic roofing systems of the disclosure.

Another embodiment is shown in exploded schematic plan view in FIG. 13, in assembled schematic plan view in FIG. 14, and in cross-sectional view along the line identified by reference numeral 1359 in FIG. 15. In this embodiment, bottom flashing element 1320 includes a top end piece 1350 and a bottom end piece 1360. The top end piece has a top end 1351 forming the top end of the bottom flashing element. The top end piece includes, at its bottom end 1352, a plurality (here, four) folded-under sections of material 1355 (indicated by the dotted line in FIG. 13). The top end piece also includes folded-over sections 1356. Such folded-over sections can provide visual interest to the visible portion of the bottom flashing element, e.g., by breaking up the otherwise linear appearance and more closely matching the appearance of an array of non-photovoltaic roofing elements down-roof therefrom. As shown in FIG. 15, these folded-over sections can be folded to be substantially parallel with the main part of the top end piece. The bottom end piece 1360 has a bottom end 1362 forming the bottom end of the bottom flashing element. The bottom end piece also includes at its top end 1361 a plurality of (here, four) folded-over sections of material 1365. As shown here, the folded-over sections of material 1365 can be in substantial registration with the folded-under sections of material 1355. Notably, when assembled as shown in FIGS. 14 and 15, the folded-under section of material of the top end piece and the folded-over section of material of the bottom piece interlock with one another so as to hold them in position relative to one another without being attached to one another. Specifically, in the embodiment of FIGS. 14 and 15, the folded-under material of the top end piece is disposed substantially between the folded-over material of the bottom end piece and the remainder of the bottom end piece, and the folded-over material of the bottom end piece is disposed substantially between the folded-under material of the top end piece and the remainder of the top end piece. The cross-section of the assembled bottom flashing element in the region of the folded-over and folded-under portions is similar to that described above with respect to FIGS. 9-12. A cross-sectional view along the line denoted by 1359 is shown in FIG. 15; in such areas, the top end piece merely sits on top of the bottom end piece. While not shown in FIGS. 13-15, the person of ordinary skill in the art will appreciate that such embodiments can include a bent-back portion at the bottom end of the bottom end piece, and/or a return hem, e.g., at the bottom end of the bottom end piece.

As the person of ordinary skill in the art will appreciate, in many embodiments of the systems described herein, part of upward-facing surface (i.e., facing away from the roof deck) of the bottom flashing element remains exposed (i.e., not covered by the photovoltaic roofing element(s).

The upward-facing surface of the bottom flashing element can be formed in a variety of manners. For example, in one embodiment, the upward-facing surface of the bottom flashing element is smooth, for example, painted or powder coated. In other embodiments, the upward-facing surface of the bottom flashing element is metallic in appearance, for example, copper or aluminum in appearance; the metal can be polished or surface coated to retain the natural luster, or in some embodiments can be allowed to weather (or even provided in pre-weathered form). In certain embodiments, the upward-facing surface is galvanized. In other embodiments, the upward-facing surface of the bottom flashing element is textured, for example, with particulate material (e.g., mineral, sand, glass cullet, ceramic microspheres, polymer), fine or coarse in size, e.g., to match or otherwise complement the appearance of the non-photovoltaic roofing element(s) disposed down-roof therefrom. The upward-facing surface can be provided with a protective polymer coating or protective film. The color of the upward-facing surface of the bottom flashing element can, for example, match or otherwise complement the roof color (e.g., of non-photovoltaic roofing elements disposed thereon), the photovoltaic media of the photovoltaic roofing element, and/or a frame or substrate portion of the photovoltaic roofing element. Similarly, the upward-facing surface can be printed with a pattern, a design, or an insignia or logo. As the person of ordinary skill in the art will appreciate, in certain embodiments, only the part of the upward-facing surface that remains exposed when installed is surface-treated as described above.

In certain embodiments, the bottom flashing element is formed from a conductive material, and includes a structure for attachment of a grounding wire. For example, the bottom flashing element can include a hole, a bolt, a nut, a rivet, a post, a screw or a clip configured to connect to a grounding wire. The grounding wire can in turn help to ground the photovoltaic roofing system, as may be required under local electrical codes.

The bottom flashing element can be affixed to the roof deck using any conventional techniques and fasteners, e.g., screws, nails, rivets or other physical connections. When a two-piece bottom flashing element is used, in certain embodiments, the top end piece is affixed to the roof while the bottom end piece is not affixed to the roof so that it can be easily removed.

Various aspects of the present disclosure can be used in conjunction with a wide variety of non-photovoltaic roofing elements. For example, in certain embodiments, the inactive roofing elements are shingles, shakes or slates. In other embodiments, the inactive roofing elements are tiles. In one particular embodiment, the roofing elements are bituminous shingles, such as those available from CertainTeed Corporation.

The person of ordinary skill in the art will appreciate that a variety of photovoltaic roofing elements can be used in various aspects of the systems described herein. In certain embodiments, each photovoltaic roofing element includes a frame structure having an upward-facing surface and a downward-facing surface. The frame structure includes an attachment zone and an exposure zone, with the exposure zone disposed toward the bottom end of the frame structure, and the attachment zone disposed toward the top end of the frame structure. The photovoltaic roofing element further includes one or more photovoltaic elements held in the frame structure. Such photovoltaic roofing elements, and flashings for use therewith, are described in detail in U.S. Pat. Nos. 8,631,614, 8,601,754 and 8,898,970 and U.S. Patent Application no. 2014/0102518, each of which is hereby incorporated herein by reference in its entirety. Other photovoltaic roofing elements are disclosed in U.S. Patent Application Publications nos. 2006/0042683A1, 2008/0149163A1, 2010/0313499A1 and 2010/0313501A1, and in U.S. Pat. No. 4,040,867, each of which is hereby incorporated by reference herein in its entirety.

In certain embodiments, the frame structure includes sidelap portions disposed at its lateral edges and having geometries adapted to interlock with adjacent photovoltaic roofing elements to provide water drainage channels. For example, in one embodiment, the sidelap portion at one lateral edge has an upward-facing water drainage channel; and the sidelap portion at the other lateral edge has a downward-facing flange that fits into the water drainage channel of an adjacent (e.g., identical) photovoltaic roofing element. This configuration is preferred, as it allows a single type of photovoltaic roofing element to be used in an installation. Of course in other embodiments, a single photovoltaic roofing element can have two upward-facing water drainage channels or two downward-facing flanges in its sidelap portions; as long as such photovoltaic roofing elements are properly mated with the corresponding features on adjacent photovoltaic roofing elements, they can be used to construct a water-tight photovoltaic roofing system. Side flashings along the ends of the contiguously-disposed plurality of photovoltaic roofing elements can have channels and/or flashings to match. When installed, any water that moves over the lateral edges of the photovoltaic roofing element will be delivered into the water drainage channel, where it can be delivered down the roof. In certain embodiments, the water drainage channel is open at the bottom edge of the frame structure, such that water can flow out of it and down over the next course of photovoltaic roofing elements. Such photovoltaic roofing elements and flashings are described in detail in U.S. Pat. Nos. 8,631,614, 8,601,754 and 8,898,970 and U.S. Patent Application no. 2014/0102518, each of which is hereby incorporated herein by reference in its entirety.

In certain embodiments, the frame structure includes sidewalls that at least partially define the area in which the one or more photovoltaic elements are held. The sidewalls desirably form a substantially closed polygon, e.g., a rectangle formed by sidewalls on all four sides. The sidewalls, e.g., those on the top sidewall and/or the bottom sidewall, can include drainage channels (formed for example as small discontinuities in the sidewalls) to allow water to drain down the roof. In certain embodiments, the sidewalls substantially enclose the area in which the one or more photovoltaic elements are held; and the one or more photovoltaic elements substantially fill the area defined by the sidewalls. For example, the one or more photovoltaic elements and/or a transparent cover element covering the photovoltaic elements desirably fit within 3 mm, within 2 mm, or even within 1 mm of the sidewalls. The sidewalls are desirably in the range of 2 mm-1 cm in height. In certain embodiments, one or more of the sidewalls do not extend beyond the height of the photovoltaic elements (i.e., in the plane of the one or more photovoltaic elements).

Figure 16:
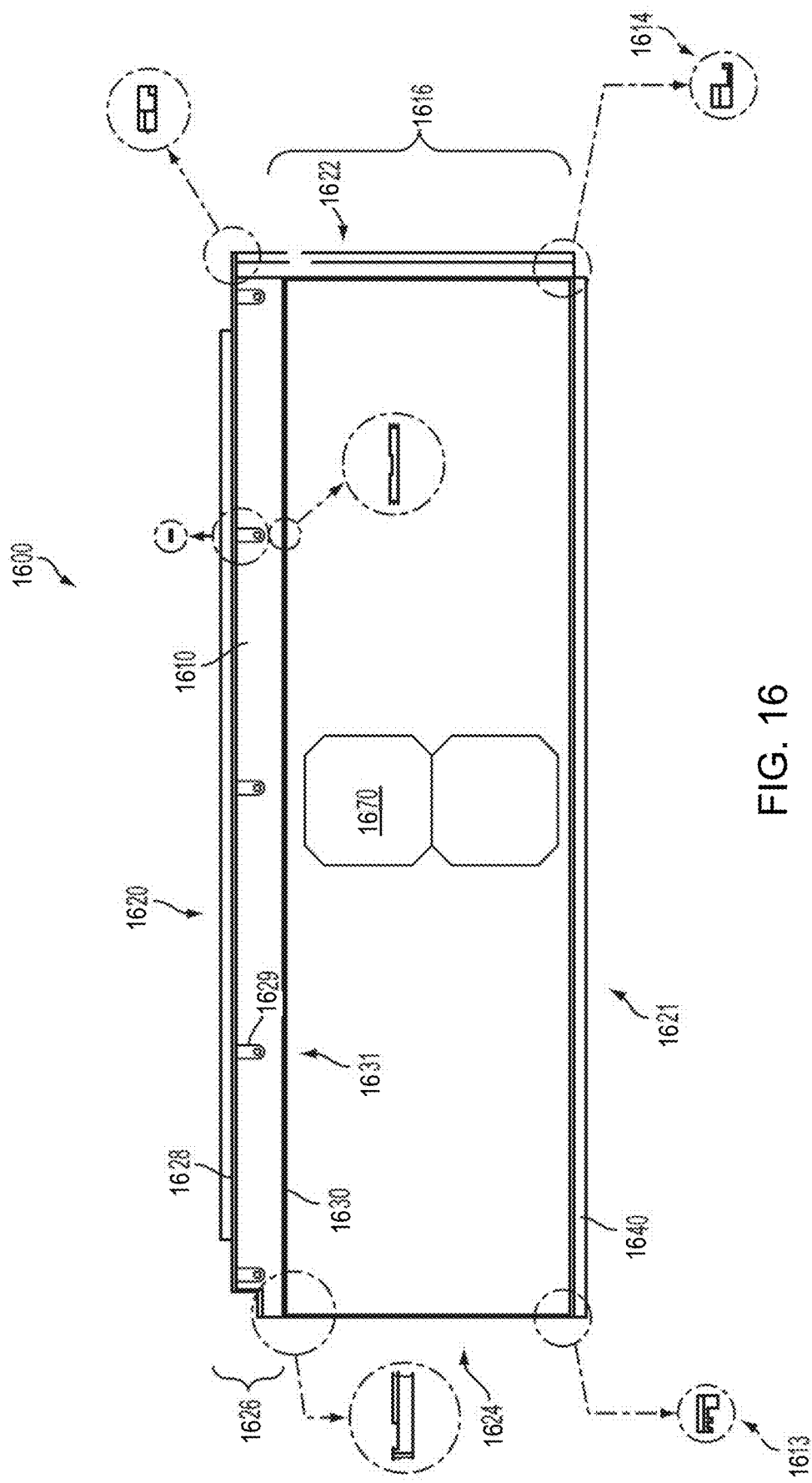
FIG. 16 provides a top view and various partial cross-sectional views of a photovoltaic roofing element suitable for use in certain embodiments of the disclosure.

One photovoltaic roofing element suitable for use in various aspects of the disclosure is shown in top view and in various partial cross-sectional views in FIG. 16. The photovoltaic roofing element 1600 of FIG. 16 includes a frame structure 1610 having an upward-facing surface and a downward-facing surface. When the photovoltaic roofing element is installed on a roof, the downward-facing surface generally faces the roof surface, while the upward-facing surface generally toward the sky.

More specifically, in certain embodiments, and in the embodiment of FIG. 16, the frame structure has a sidelap feature 1613 at its left lateral edge, and a shiplap feature 1614 at its right lateral edge, equipped with water dams and drainage paths to minimize water intrusion into the roof. The shiplap feature 1614 includes a water drainage channel; and sidelap feature 1613 includes a downward-facing flange that is configured to fit in the water drainage channel of the shiplap feature of an adjacent photovoltaic roofing element. As will be described in more detail hereinbelow, such photovoltaic roofing elements can be installed on a roof using flashing having coordinating dam and drainage structures.

In the embodiment of FIG. 16, the exposure area 1616 of the frame structure is equipped with two rows of seven photovoltaic elements 1670, each about 5"×5" in dimension. For the sake of clarity, and in order to show the details of the frame structure, only two such photovoltaic elements are shown. The frame structure has a top edge 1620, a bottom edge 1621, a right edge 1622 and a left edge 1624. When installed on a roof deck, the top edge is disposed toward the ridge side (i.e., the top end) of the roof deck (i.e., toward its top end), and the bottom edge is disposed toward the eave side (i.e., the bottom end) of the roof deck (i.e. toward its bottom end). In the embodiment of FIG. 16, near the top end is an attachment zone 1626 for fastening the photovoltaic roofing element to a roof structure. A raised lip 1628 is provided at the top end of the attachment zone as a dam against water, in order to help prevent moisture intrusion over the upper edge of the photovoltaic roofing element and help to close the roof to the environment. Mounting tabs 1629 are provided at several locations across the width of the attachment zone with raised nail bosses, the raised structure providing additional protection from water intrusion through the nail holes. Near the bottom end of the attachment zone is a top sidewall 1630, delineating the top edge of the area in which the one or more photovoltaic elements are disposed. Spaced along this top sidewall are drainage openings (e.g., slots or weep holes) 1631, such that any water in the attachment zone can drain down the roof over the exposure area 1616 of the photovoltaic roofing element.

Figure 17:
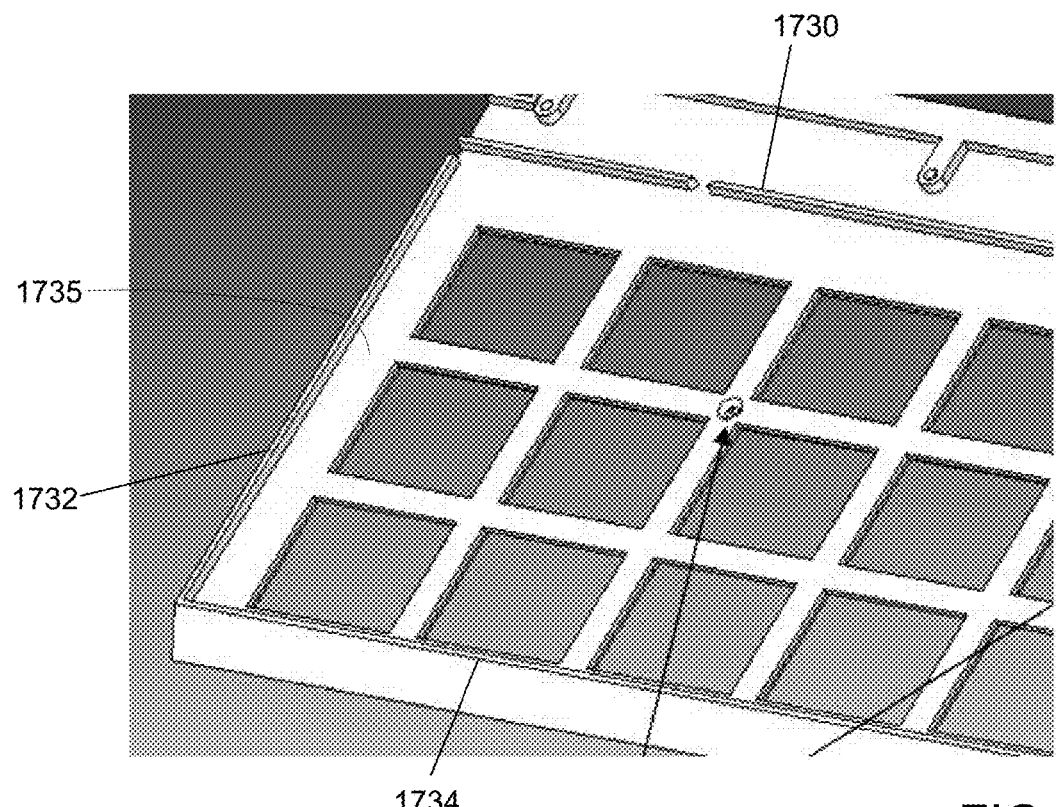
FIG. 17 provides a partial perspective view of a frame structure suitable for use in certain embodiments of the disclosure.

A top perspective view of a similar frame structure is shown in FIG. 17. The frame structure of FIG. 17 includes top sidewall 1730, as well as sidewalls 1732 and 1734, defining the left, and bottom edges of the area in which the one or more photovoltaic elements are disposed. In certain embodiments, a similar sidewall is provided at the right edge of the area in which the one or more photovoltaic elements are disposed (i.e. internally adjacent the shiplap feature as described above with respect to FIG. 17). The frame structure is otherwise similar to that described above with respect to FIG. 17. In other embodiments, no sidewall is provided at the right edge; the left-edge sidewall of an adjacent frame structure provides the fourth sidewall defining the area in which the one or more photovoltaic elements are disposed. In certain embodiments, the sidewalls extend above the upward-facing surface 1735 of the area in which the one or more photovoltaic elements are disposed by at least about 1 mm, at least about 2 mm, or even by at least about 3 mm. In certain embodiments, however, the sidewalls extend above the upward-facing surface 1735 of the area in which the one or more photovoltaic elements are disposed by no more than about 15 mm, no more than about 10 mm, or even by no more than about 8 mm.

Figure 18:
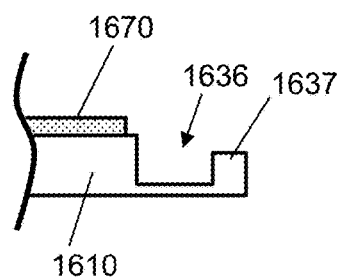
FIGS. 18 and 19 provide cross-sectional schematic views of left- and right-lateral edges of a photovoltaic roofing element suitable for use in certain embodiments of the disclosure.
Figure 19:
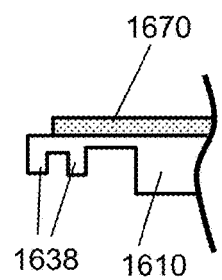

The photovoltaic roofing elements of FIGS. 16 and 17 can be arranged in an array, with laterally adjacent photovoltaic roofing elements being engaged with one another in a shiplap manner. The photovoltaic roofing element has on one lateral edge (in FIG. 16, the right-hand edge) an upward-facing water drainage channel. FIG. 18 is a cross-sectional view of the photovoltaic roofing element of FIG. 16 in its exposure zone at its right hand edge, in which the frame structure 1610, photovoltaic element 1670, and upward-facing channel 1636 is visible. An outer flange 1637 defines the upward-facing water drainage channel. The upward-facing water drainage channel is preferably open at the bottom edge of the photovoltaic roofing element, such that any water entering the gap between adjacent photovoltaic roofing elements is collected therein and conducted down the roof. As shown in FIG. 18, the upward-facing channel is at a lower elevation with respect to the attachment zone. The photovoltaic roofing element has on its opposite lateral edge (in FIG. 16, the left-hand edge) a downward-facing flange (e.g., a ridge), configured such that the downward-facing flange of one photovoltaic roofing element can engage the upward-facing channel of an adjacent photovoltaic roofing element. FIG. 19 is a cross-sectional view of the photovoltaic roofing element of FIG. 16 in its exposure zone at its left-hand edge, in which two downward-facing flanges 1638 are visible. These downward-facing flanges are configured to fit in the upward-facing water drainage channel of an adjacent photovoltaic roofing element.

The person of skill in the art will appreciate that the inside corner flashing elements can be configured such that the first horizontal portions thereof can engage the photovoltaic roofing element at the first end of the second course in a shiplap manner as described above with respect to FIGS. 18 and 19. Accordingly, in certain embodiments, the first horizontal portion of the inside corner flashing element can be formed as shown in FIG. 18, or as shown in FIG. 19.

In certain embodiments, and as shown at the lower edge of the photovoltaic roofing element of FIG. 16, a leading edge extension 1640 is provided to cover an upper portion of a photovoltaic roofing element of an underlying course of photovoltaic roofing elements. When installed in an array, the leading edge extension 1640 can extend substantially to the exposure zone of an underlying course of photovoltaic roofing elements, to improve conduction of water down the roof. In certain embodiments, the leading edge extension does not span the entire length of the frame structure; for example, as shown in FIG. 16, it can be missing in one of the sidelap portions, such that the leading edge extensions of adjacent photovoltaic roofing elements do not interfere with one another. In certain embodiments, the leading edge extension includes a recess on its downward-facing surface, to accommodate the raised lip 1628 at the top end of the attachment zone of an overlying photovoltaic roofing element, thereby forming part of the water barrier system between the panels. In use, the leading edge extension can be covered by the one or more photovoltaic elements; it need not be a visually distinct feature. Of course, in other embodiments, the sidelap and shiplap features can extend the entire height of the frame structure, so that the entire height of the lateral edges of adjacent elements interlock to one another.

Figure 20:
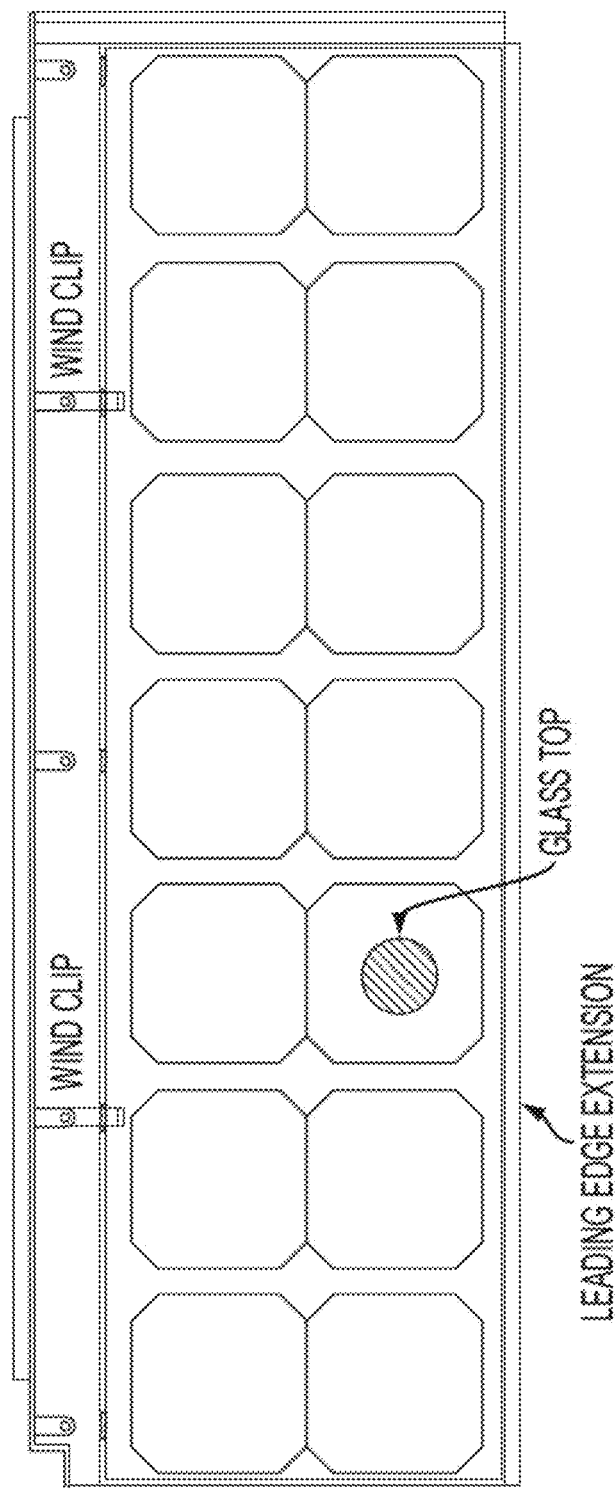
FIG. 20 is a schematic plan view of a photovoltaic roofing element suitable for use in certain embodiments of the disclosure.

FIG. 20 is another top schematic view of the photovoltaic roofing element of FIGS. 16 and 17 with a rigid photovoltaic element (e.g., a module including the two rows of seven photovoltaic cells as described above, with a tempered glass cover to protect the cells). Cells are laterally spaced at intervals of about ¾ inch. The cells are inset from the top and bottom edges of the module by about ½ inch and from the left and right lateral edges by about ⅜ inch. Preferably, the cells of the module are inset from the edges of the module sufficiently to conform to UL, NEC or other electrical code requirements. The module is set into the panel in the area formed by the sidewalls and sealed in place with an appropriate sealant, e.g., as a perimeter ridge surrounding the module. The photovoltaic element (here, the module as defined by its tempered glass cover) will preferably be within 3 mm, within 2 mm, or even within 1 mm of the sidewalls. Preferably, the ridge running along the top edge of the module provides a raised lip at the lower edge of the attachment zone and has drainage openings as described above to provide drainage over the top surface of the module in the exposed area of the photovoltaic roofing element.

In the embodiment of FIG. 20, the bottom edge of the photovoltaic roofing element is formed by the leading edge extension, but as described above, in some embodiments, no leading edge extension is at the bottom edge of the photovoltaic roofing element. In either event, an indicator line is shown in FIG. 20 about ½ inch below the ridge at the bottom end of the attachment zone to suggest where the bottom edge of an overlying photovoltaic roofing element would lie in the installed condition. The bottom edge of the overlying photovoltaic roofing element preferably covers the horizontal-running seam where the photovoltaic element is disposed in the frame structure (i.e., along the top sidewall). Wind clips are shown to be attached using two of the nail boss fastening zones using the same fasteners to mount the panel to a roof structure; the wind clips can hold down the bottom edge of the overlying photovoltaic roofing element. In this embodiment, the drainage holes in the lower lip of the attachment zone are aligned with the nail bosses so that the wind clips pass through the drainage holes and provide an upward directed hook or clip to assist in securing an overlying course of photovoltaic roofing elements to the already installed lower course.

In certain embodiments, the lower edges of the first and second horizontal portions of the inside corner flashing element extend down the roof beyond the leading edge extension.

Figure 21:
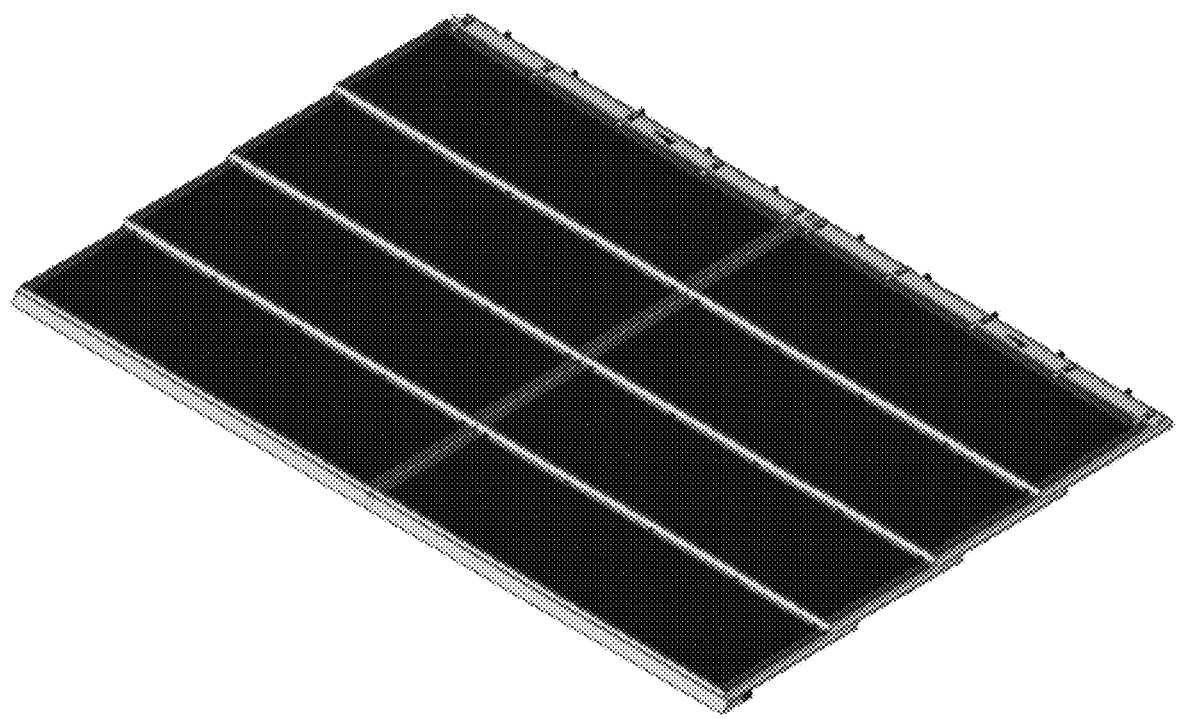
FIG. 21 is a schematic perspective view of an array of photovoltaic roofing elements.

FIG. 21 shows a small array of the photovoltaic roofing elements of FIG. 20. The array of FIG. 21 is two photovoltaic roofing elements wide and four photovoltaic roofing elements high. Lateral edge and top flashing (not shown) can be provided as described in U.S. Pat. Nos. 8,631,614, 8,601,754 and 8,898,970 and U.S. Patent Application no. 2014/0102518, to close the array at the sides and top and merge the photovoltaic array into a field of surrounding conventional non-photovoltaic roofing elements (e.g., shingles). The bottom flashing elements can, be configured to close the array in conjunction with the other flashings, e.g., by being covered by the side flashings.

Figure 22:
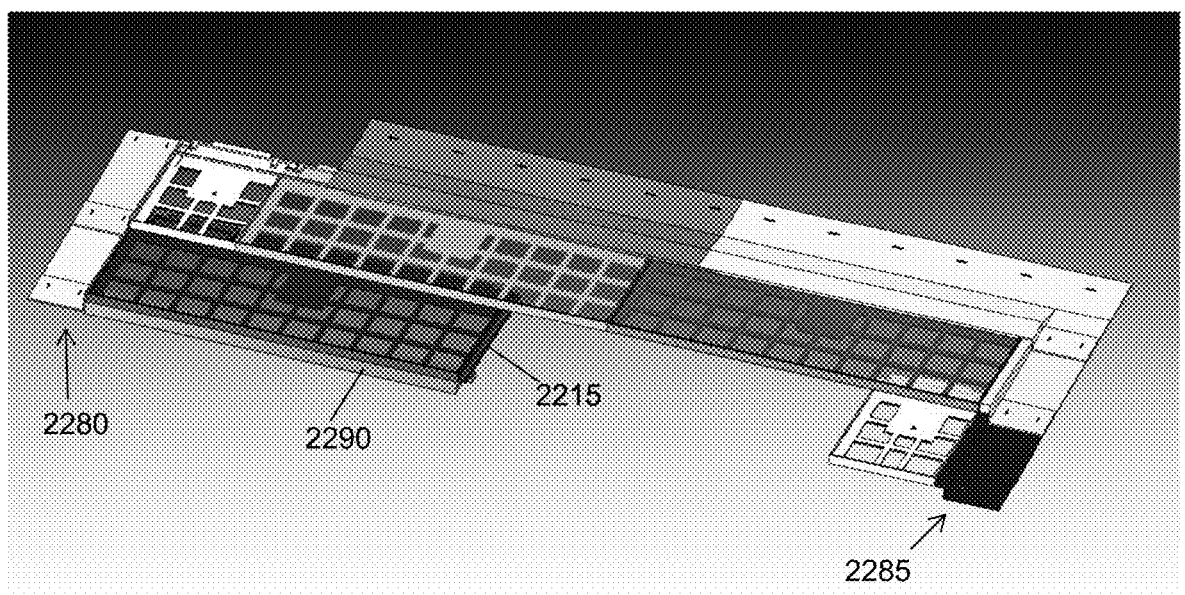
FIG. 22 is a schematic perspective view of an array of frame structures assembled together with lateral edge and top flashings.

Certain aspects of the disclosure relate to the fashion in which flashing elements are provided to close the transition that merges a photovoltaic array made up of photovoltaic roofing elements into the field of non-photovoltaic roofing elements (e.g., shingles) used in conjunction with the photovoltaic roofing elements. Flashing elements as installed together with a small array of photovoltaic roofing elements (frame structures shown) are shown in perspective view in FIG. 22. The view of FIG. 22 does not show a bottom flashing, but does show examples of flashing of the top and lateral edges of an array. FIG. 22 also shows a starter strip 2290. The starter strip can be configured so that the bottom end photovoltaic roofing element(s) 2215 are canted at the same angle (i.e., relative to the roof deck) as the other photovoltaic roofing element(s). The starter strip and the down-roof ends of the lateral edge flashing elements 2280 and 2285 can be disposed on the bottom flashing element (e.g., on the top end piece thereof, but not extending down to the bottom end piece thereof).

Accordingly, in certain embodiments the photovoltaic roofing system includes a plurality of photovoltaic roofing elements contiguously disposed on the roof deck, the contiguously-disposed roofing elements together having a top edge facing the top end of the roof deck, a bottom edge facing the bottom end of the roof deck, and two lateral edges. Each photovoltaic roofing element comprises one or more photovoltaic elements disposed on a frame structure. The frame structure includes sidelap portions having geometries adapted to interlock with adjacent photovoltaic roofing elements to provide water drainage channels. The photovoltaic roofing system also includes a plurality of roofing elements disposed adjacent the contiguously-disposed photovoltaic roofing elements, along their lateral edges. The photovoltaic roofing system further comprises lateral flashing elements disposed along the lateral edges of the contiguously-disposed photovoltaic roofing elements, the lateral edge flashing elements having a cross-sectional shape comprising a vertically-extending feature and a flange extending away from a lateral edge at the downward end of the vertically-extending feature, with the flange facing away from the contiguously-disposed photovoltaic roofing elements and being at least partially disposed between a roofing element and the roof deck. The vertically-extending feature includes a matched interlocking geometry adapted to interlock with the sidelap portion of an adjacent photovoltaic roofing element. For example, in certain embodiments, the vertically-extending features of the lateral edge flashing elements along a first lateral edge of the contiguously-disposed photovoltaic roofing elements include a downward-facing flange, disposed in upward-facing channels of the photovoltaic roofing elements disposed along the first lateral edge; and wherein the vertically-extending features of the lateral edge flashing elements along a second lateral edge of the contiguously-disposed photovoltaic roofing elements include an upward-facing water drainage channel, into which downward-facing flanges of the photovoltaic roofing elements disposed along the second lateral edge are disposed.

A top flashing can also be included to merge the photovoltaic roofing system with a field of conventional roofing products and close the transition areas therebetween to the elements. Accordingly, in certain embodiments, one or more top flashing elements is or are disposed along the top edge of the contiguously-disposed photovoltaic roofing elements, the one or more top flashing elements having a bottom end disposed over the top edge of the contiguously-disposed photovoltaic roofing elements; and a top end disposed under one or more roofing elements disposed along the top edge of the contiguously-disposed photovoltaic roofing elements.

FIGS. 23, 24 and 25 show top schematic views and edge schematic views of examples of top flashing elements for closing the top portion of the array of photovoltaic roofing elements according to one embodiment of the disclosure. In these figures, the top plan views depict the leftmost side of a given flashing section near the top of the drawing and the rightmost side near the bottom of the drawing. In FIGS. 23-25, the lineal or standard piece for flashing the array, but not at an edge of the array, has hidden lap alignment features. At the left end of the flashing element, a portion is thinned for a distance on the bottom of the piece, dashed lines indicating the thinning on the bottom. At the right end, the thinning is at the top. When adjacent flashing elements are installed across the array, the left end overlaps the right end of an adjacent section of flashing. The thinning of the end provides an indicator for proper lateral overlap at the end. From left to right in FIG. 23, the flashing has three zones. The two left zones go up and over the upper edge of the topmost course of the photovoltaic roofing panels in the array. The right portion is flat on the roof deck. Conventional roofing materials are installed so that they overlap at least the right uppermost portion of the top flashing to direct moisture down the roof. In some instances, the exposure zone of a conventional roofing product may extend to cover the majority, or completely cover, the top flashing elements across the photovoltaic roofing product array. FIG. 24 shows views of a right end top flashing element. The upper flat flange in the plane of the roof deck extends around to the right end beyond the raised bend feature. FIG. 25 shows views of a left end top flashing element, the flashing flange extending around to the left. The raised bend feature covers the top edge of the photovoltaic roofing array. The flanges underlie adjacent conventional roofing materials. The flashings can be formed from a variety of materials; for example, they can be molded or formed from plastic or metal.

FIG. 26 is a set of schematic views (top, back, side and front) of a right lateral edge flashing element 2680 for use with photovoltaic roofing elements of FIGS. 16, 17 and 20 according to one embodiment of the disclosure. The right side flashing element is installed along the right lateral edge of a set of contiguously-disposed photovoltaic roofing elements. It includes an overlap portion 2610 and an exposed portion 2615. The top schematic view of FIG. 26 has the uppermost portion of the right flashing at the lower end of the figure. A cut-back notch 2620 is provided so that an overlying right side flashing element can fit into the underlying piece with a flush right edge. The side schematic view in FIG. 26 shows that the right side flashing element has a greater height at its lower end (left side of the side schematic view) than at its upper end, to accommodate the canting of the photovoltaic roofing elements in the course as they overlie the underlying course. The front view (i.e., looking up the roof) and the back view (i.e., looking down the roof) show downward directed ridges that interact cooperatively with the underlying drainage channel at the right side edge of the roofing panel of FIG. 16. The downward directed structures are analogous to the structures shown at the left edge of the photovoltaic roofing element of FIG. 16. The right lateral edge flashing element engages with the right side edge of the roofing panel in a shiplap fashion, with the flange (i.e., overlap portion 2610) extending under adjacent conventional roofing material to flash in and close the roof to the elements. In some embodiments, the flange extends at least about 2 inches, at least about 4 inches, at least about 6 inches, or at least about 8 inches or more under the adjacent roofing materials. It will be understood that for use with photovoltaic roofing elements of another dimension, the size and proportion of the right side flashing elements may be suitably adapted. It will also be understood that the first horizontal portion of the inside corner flashing element can be formed as described above with respect to the exposed portion 2615.

Figure 27:
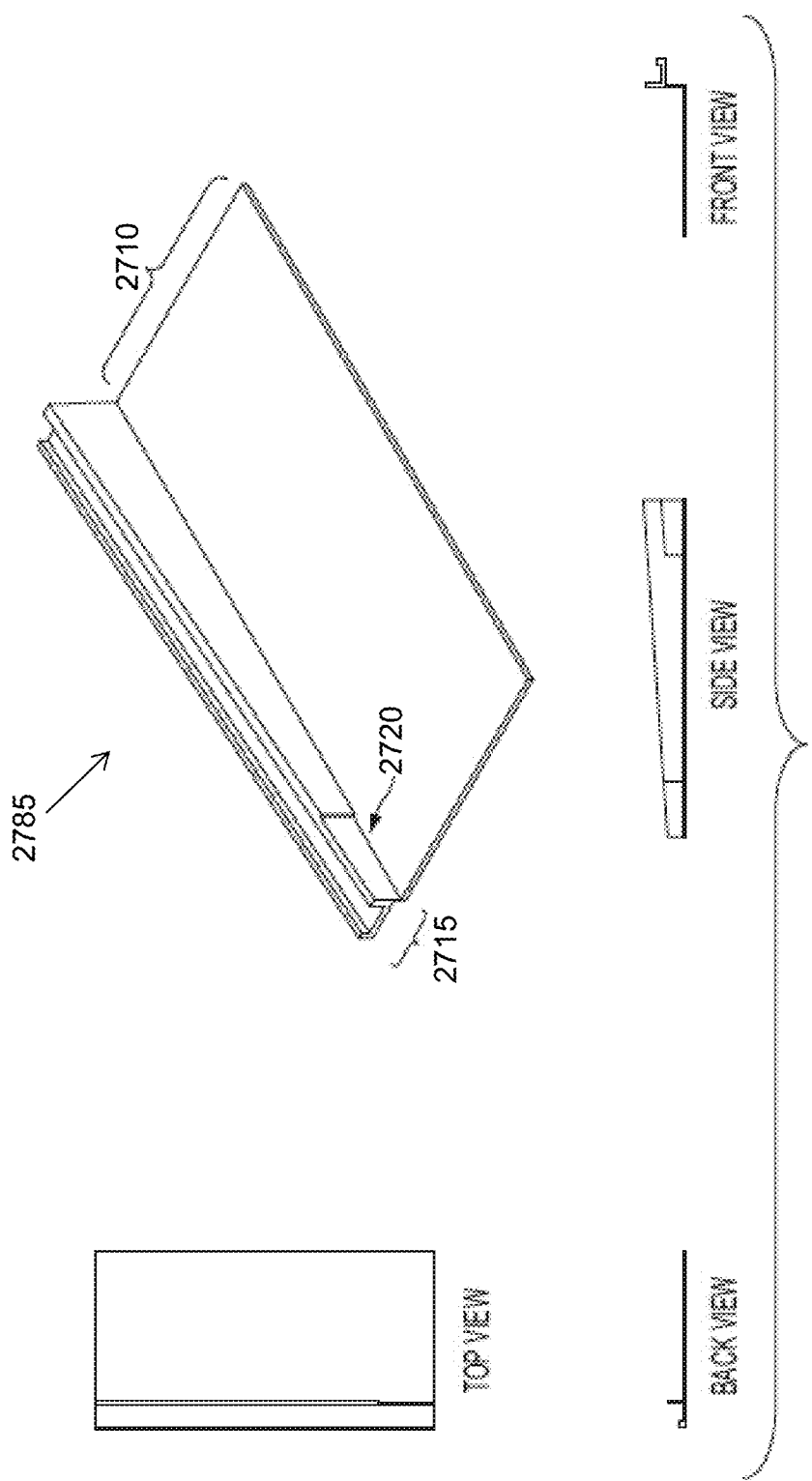

FIG. 27 is a set of schematic views (top, back, side, front and perspective) of a left lateral edge flashing element 2785 for use with photovoltaic roofing elements of FIGS. 16, 17 and 20 according to one embodiment of the disclosure. The left lateral edge flashing element is installed along the left edge of a set of contiguously-disposed photovoltaic roofing elements. It includes an overlap portion 2710 and an exposed portion 2715. The top view of FIG. 27 has the uppermost portion of the left side flashing element at the lower end of the figure. A cut-back notch 2720 is provided so that an overlying left lateral edge flashing element can fit into the underlying piece with a flush left edge. The side view in FIG. 27 shows that the left lateral edge flashing element has a greater height at its lower edge (at the right side of the figure) than at its upper end to accommodate the canting of the photovoltaic roofing elements in the course as they overlie the underlying course. The front view of the left lateral edge flashing element is taken looking up the roof and the back view is taken looking down the roof. The front view (i.e., looking up the roof) and the back view (i.e., looking down the roof) show the upward-directed edge ridge and drainage channel that interact cooperatively with the overlying downward-directed ridges at the left lateral edge of the photovoltaic roofing element of FIGS. 16, 17 and 20. The upward directed ridge and drainage channel are analogous to the structures shown at the right edge of the photovoltaic roofing element of FIG. 16. Preferably, the left lateral edge flashing is installed prior to installation of a leftmost photovoltaic roofing element in a course. The left lateral edge flashing element engages with the left lateral edge of the photovoltaic roofing element in a shiplap fashion and provides a flange (i.e., the overlap portion 2710) to extend under adjacent conventional roofing material to flash in and close the roof to the elements. In some embodiments, the flange extends at least about 2 inches, at least about 4 inches, at least about 6 inches, or at least about 8 inches or more under the adjacent roofing materials. It will be understood that for use with photovoltaic roofing elements of another dimension, the size and proportion of the left lateral edge flashing elements may be suitably adapted. It will also be understood that if geometries of parts of the roofing system including photovoltaic roofing elements and flashing components are reversed, such as for example by mirroring, that preferred orders of installation may also accommodate such changes. It will also be understood that the first horizontal portion of the inside corner flashing element can be formed as described above with respect to the exposed portion 2715.

While various elements are denoted "right" and "left" here, the person of skill in the art will appreciate that they may be provided in mirror image form.

In preferred photovoltaic roofing systems the parts are available in modular components that fit together and can be kitted in advance to minimize the need for fabrication on site. For example, flashing components and cant strips, in this instance, are provided in lengths that are integral multiples of the dimensions of the photovoltaic roofing elements or partial photovoltaic roofing element sizes to accommodate predetermined arrays for the roofing system in dimensions and power ratings suitable for a particular roofing project. Accordingly, assembly on the roof can be simplified.

Any cabling or wiring interconnecting the photovoltaic roofing elements of the disclosure in a photovoltaic roofing system can, for example, be long and flexible enough to account for natural movement of a roof deck, for example due to heat, moisture and/or natural expansion/contraction. The cabling or wiring can be provided as part of a photovoltaic roofing element, or alternatively as separate components that are interconnected with the photovoltaic roofing elements (e.g., through electrical connectors) during installation.

Examples of electrical connectors that can be suitable for use or adapted for use in practicing various embodiments of the disclosure are available from Kyocera, Tyco Electronics, Berwyn, Pa. (trade name Solarlok) and Multi-Contact USA of Santa Rosa, Calif. (trade name Solarline). U.S. Pat. Nos. 7,445,508 and 7,387,537, U.S. Patent Application Publications nos. 2008/0271774, 2009/0126782, 2009/0133740, 2009/0194143 and 2010/0146878, each of which is hereby incorporated herein by reference in its entirety, disclose electrical connectors for use with photovoltaic roofing products. Of course, other suitable electrical connectors can be used. Electrical connectors desirably meet UNDERWRITERS LABORATORIES and NATIONAL ELECTRICAL CODE standards.

Figure 28:
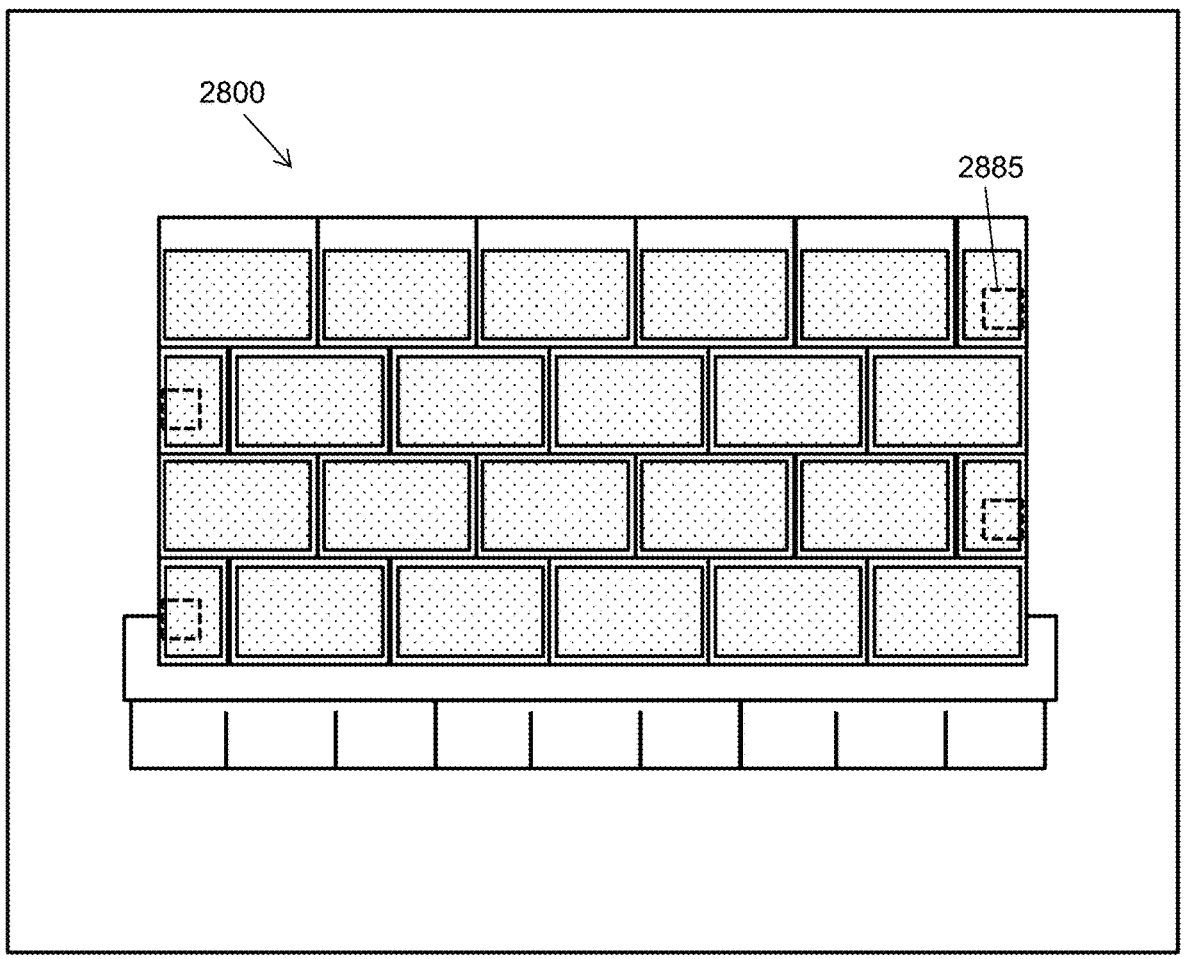
FIG. 28 is a schematic plan view of a photovoltaic roofing system according to another embodiment of the disclosure.

In certain embodiments, the photovoltaic roofing elements of the array are electrically interconnected. The interconnected photovoltaic array can be interconnected with one or more inverters to allow photovoltaically-generated electrical power to be used on-site, stored in a battery, or introduced to an electrical grid. For example, a single inverter can be used to collect the photovoltaically-generated power and prepare it for further use. In other embodiments, the photovoltaic roofing elements can be interconnected with a plurality of micro-inverters disposed on the roof. For example, a single micro-inverter can be used for each photovoltaic roofing element; or a single micro-inverter can be used for a group of photovoltaic roofing elements. FIG. 28 is a schematic plan view of a photovoltaic roofing system 2800 according to one embodiment of the disclosure. In the system of FIG. 28, a microinverter 2885 is disposed under a photovoltaic element at the edge of each row, each microinverter being operatively coupled (e.g., in series) to the photovoltaic roofing elements of its respective row (via wiring, not shown for purposes of clarity).

Another aspect of the disclosure is a roof comprising a roof deck and a photovoltaic roofing system as described herein disposed on the roof deck. The photovoltaic roofing systems described herein can be utilized with many different building structures, including residential, commercial and industrial building structures.

There can be one or more layers of material (for example, one or more relatively thin sheets of material (e.g., less than 3 mm in thickness), such as membrane or underlayment), between the roof deck and the photovoltaic roofing system. The roof can also include one or more standard roofing elements, for example to provide weather protection at the edges of the roof, or in areas not suitable for photovoltaic power generation. In some embodiments, non-photovoltaically-active roofing elements are complementary in appearance or visual aesthetic to the photovoltaic roofing elements. Standard roofing elements can be interleaved at the edges of the photovoltaic arrays described herein. In certain embodiments, the photovoltaic roofing elements are simply disposed on top of an already-installed array of standard roofing elements (e.g., an already-shingled roof).

Another aspect of the disclosure is a method for installing a photovoltaic system as described herein, including disposing on a surface (e.g., a roof) disposing the plurality of photovoltaic roofing elements, the one or more bottom flashing elements and the one or more non-photovoltaic roofing elements as described herein. The photovoltaic roofing elements can be electrically interconnected as part of this process.

The person of ordinary skill in the art will appreciate, based on the description herein, that one advantage of the use of bottom flashing elements of the disclosure is that the non-photovoltaic roofing elements can be installed at a later time than the photovoltaic roofing elements. Thus, a conventional roofer can install the non-photovoltaic roofing elements, after the more specialized installation of the photovoltaic roofing elements is completed.

Accordingly, in one embodiment, a method for installing a photovoltaic roofing system on a roof deck includes disposing on the roof deck a plurality of photovoltaic roofing elements, contiguously disposed on the roof deck, the contiguously-disposed plurality of photovoltaic roofing elements defining a bottom edge, the contiguously-disposed roofing elements including one or more bottom end photovoltaic roofing elements disposed at the bottom edge thereof, each of the bottom end photovoltaic roofing elements having a bottom end; and one or more bottom flashing elements disposed along the bottom edge of the contiguously-disposed plurality of photovoltaic roofing elements, each of the one or more bottom flashing elements having an upward-facing surface, a top end and a bottom end, and a first lateral end and a second lateral end, the top end of each of the one of more bottom flashing elements being substantially disposed under at least one of the bottom end photovoltaic roofing elements at the bottom end thereof such that the bottom end of each of the one or more bottom flashing elements protrudes beyond the bottom edge of the contiguously-disposed photovoltaic roofing elements. Then, the method includes, at a substantially later time, disposing on the roof deck one or more non-photovoltaic roofing elements disposed along the bottom end of the one or more bottom flashing elements, each non-photovoltaic roofing element having an exposure zone at a bottom end thereof and a headlap zone at a top end thereof, the headlap zone of each non-photovoltaic roofing element being disposed under one or more of the bottom end flashing elements at the bottom end thereof.

In another embodiment in which each of the bottom flashing elements includes a top end piece and a bottom end piece, the top end piece of each of the bottom flashing elements is installed with the photovoltaic roofing elements, and the bottom end piece of each of the bottom flashing elements is installed with the non-photovoltaic roofing elements. In certain embodiments, a method for installing a photovoltaic roofing system on a roof deck includes first, disposing on the roof deck a plurality of photovoltaic roofing elements, contiguously disposed on the roof deck, the contiguously-disposed plurality of photovoltaic roofing elements defining a bottom edge, the contiguously-disposed roofing elements including one or more bottom end photovoltaic roofing elements disposed at the bottom edge thereof, each of the bottom end photovoltaic roofing elements having a bottom end; and one or more top pieces of one or more bottom flashing elements disposed along the bottom edge of the contiguously-disposed plurality of photovoltaic roofing elements. Then, at a substantially later time, disposed on the roof deck are one or more bottom pieces of the one or more bottom flashing elements disposed along the bottom end of the one or more top pieces thereof, such that each of the one or more bottom flashing elements has an upward-facing surface, a top end and a bottom end, and a first lateral end and a second lateral end, the top end of each of the one of more bottom flashing elements being substantially disposed under at least one of the bottom end photovoltaic roofing elements at the bottom end thereof such that the bottom end of each of the one or more bottom flashing elements protrudes beyond the bottom edge of the contiguously-disposed photovoltaic roofing elements; and one or more non-photovoltaic roofing elements disposed along the bottom end of the one or more bottom flashing elements, each non-photovoltaic roofing element having an exposure zone at a bottom end thereof and a headlap zone at a top end thereof, the headlap zone of each non-photovoltaic roofing element being disposed under one or more of the bottom end flashing elements at the bottom end thereof.

In such embodiments as described above, the one or more non-photovoltaic roofing elements are disposed on the roof deck at least one day, at least two days, or at least a week after the photovoltaic roofing elements and the one or more bottom flashing elements are disposed on the roof.

The disclosure also provides methods for replacing one or more of the non-photovoltaic roofing elements of the photovoltaic roofing systems described herein. In many advantageous embodiments, the non-photovoltaic roofing elements can be replaced without substantially disturbing the photovoltaic roofing elements.

For example, one embodiment of a method for replacing one or more of the non-photovoltaic roofing elements of a photovoltaic roofing system as described herein with one or more replacement non-photovoltaic roofing elements includes moving the bottom end of one or more of the bottom flashing elements away from the top end of the one or more non-photovoltaic roofing elements; detaching the one or more non-photovoltaic roofing elements from the roof deck; removing the one or more non-photovoltaic roofing elements from the roof deck; disposing the one or more replacement non-photovoltaic roofing elements on the roof deck; attaching the one or more replacement non-photovoltaic roofing elements to the roof deck; and moving the bottom end of the one or more of the bottom flashing elements to cover the top end of the one or more non-photovoltaic roofing elements.

In another embodiment, a method for replacing one or more of the non-photovoltaic roofing elements of a photovoltaic roofing system in which each of the bottom flashing elements includes a top end piece and a bottom end piece with one or more replacement non-photovoltaic roofing elements includes moving the bottom end piece of one or more of the bottom flashing elements away from the top end of the one or more non-photovoltaic roofing elements; detaching the one or more non-photovoltaic roofing elements from the roof deck; removing the one or more non-photovoltaic roofing elements from the roof deck; disposing the one or more replacement non-photovoltaic roofing elements on the roof deck; attaching the one or more replacement non-photovoltaic roofing elements to the roof deck; and moving the bottom end piece of the one or more of the bottom flashing elements to cover the top end of the one or more non-photovoltaic roofing elements. In certain such embodiments, moving the bottom end piece of one or more of the bottom flashing elements away from the top end of the one or more non-photovoltaic roofing elements comprises removing the bottom end piece of each of the one or more of the bottom flashing elements away from the corresponding top end piece, and wherein moving the bottom end piece of the one or more of the bottom flashing elements to cover the top end of the one or more non-photovoltaic roofing elements includes assembling the bottom end piece of the one or more of the bottom flashing elements together with the corresponding top end piece.

Further, the foregoing description of embodiments of the present disclosure has been presented for the purposes of illustration and description. It is not intended to be exhaustive or to limit the disclosure to the precise forms disclosed. As the person of skill in the art will recognize, many modifications and variations are possible in light of the above teaching. It will be apparent to those skilled in the art that various modifications and variations can be made to the present disclosure without departing from the scope of the disclosure. Thus, it is intended that the present disclosure cover the modifications and variations of this disclosure provided they come within the scope of the claims and their equivalents.

What is claimed is:

1. A photovoltaic roofing system disposed on a roof deck having a top end, a bottom end, a first lateral side and a second lateral side opposing the first lateral side, the photovoltaic roofing system comprising:
a plurality of contiguously-disposed, discrete photovoltaic roofing elements, the photovoltaic roofing elements being photovoltaic roofing shingles, photovoltaic roofing tiles, photovoltaic roofing shakes or photovoltaic roofing slates, each of the photovoltaic roofing elements being disposed directly against the roof deck or directly against one or more sheets of membrane or underlayment disposed against the roof deck, the contiguously-disposed plurality of photovoltaic roofing elements defining a bottom edge, the contiguously-disposed photovoltaic roofing elements including one or more bottom end photovoltaic roofing elements disposed in a row at the bottom edge thereof, each of the bottom end photovoltaic roofing elements having a bottom end;
one or more bottom flashing elements disposed along the bottom edge of the contiguously-disposed plurality of photovoltaic roofing elements such that the one or more bottom flashing elements extend along the entire bottom edge of the contiguously-disposed plurality of photovoltaic roofing elements, each of the one or more bottom flashing elements having an upward-facing surface, a top end and a bottom end, and a first lateral end and a second lateral end, the top end of each of the one or more bottom flashing elements being substantially disposed under at least one of the bottom end photovoltaic roofing elements at the bottom end thereof such that each of the bottom end photovoltaic roofing elements is disposed on one or more of the bottom flashing elements, and such that the bottom end of each of the one or more bottom flashing elements protrudes beyond the bottom edge of the contiguously-disposed photovoltaic roofing elements, and such that the entire bottom edge of the contiguously-disposed photovoltaic roofing elements is disposed over the one or more bottom flashing elements, wherein each of the one or more bottom flashing elements comprises
a top end piece having a top end forming the top end of the bottom flashing element, the top end piece being affixed to the roof; and
a bottom end piece separate from the top end piece, the bottom end piece having a bottom end forming the bottom end of the bottom flashing element, the bottom end piece not being affixed to the roof or to the top end piece, the bottom end piece being removably interlocked with the top end piece so as to hold it in position relative to the top end piece, wherein the plurality of photovoltaic roofing elements do not extend to the bottom end piece of any of the bottom end flashing elements; and
a plurality of non-photovoltaic roofing elements disposed in a row extending along the entirety of the bottom end of the one or more bottom flashing elements, each non-photovoltaic roofing element having an exposure zone at a bottom end thereof and a headlap zone at a top end thereof, the headlap zone of each non-photovoltaic roofing element being disposed under one or more of the bottom end flashing elements at the bottom end thereof, such that each of the bottom flashing elements is disposed on the headlap zone of one or more of the non-photovoltaic roofing elements, and each of the non-photovoltaic roofing elements of the row is overlapped by one or more of the bottom end flashing elements, wherein the one or more non-photovoltaic roofing elements disposed along the bottom end of the one or more bottom flashing elements are affixed to the roof deck by one or more fasteners, the one or more fasteners being disposed under bottom end piece(s) of the one or more bottom end flashing elements.

2. A photovoltaic roofing system according to claim 1, wherein each bottom flashing element is generally linear, extending from the first lateral end thereof to the second lateral end thereof.

3. The photovoltaic roofing system according to claim 1, wherein each of the one or more bottom flashing elements is formed as a plurality of pieces.

4. The photovoltaic roofing system according to claim 1, wherein in each of the one or more bottom flashing elements
the top end piece has a bottom end, the top end piece comprising at its bottom end one or more folded-under sections of material; and
the bottom end piece has a top end, the bottom end piece comprising at its top end one or more folded-over sections of material,
wherein the one or more folded-under sections of material of the top end piece interlock with the one or more folded-over sections of material of the bottom end piece.

5. The photovoltaic roofing system according to claim 4, wherein the one or more folded-under sections of material do not extend fully to one of the ends of the top end piece and/or the one or more folded-over sections of material do not extend fully to one of the ends of the bottom end piece.

6. A photovoltaic roofing system according to claim 1, wherein the width of the one or more bottom flashing elements is at least about three inches.

7. A photovoltaic roofing system according to claim 1, wherein each of the one or more bottom flashing elements is formed from a rigid material.

8. The photovoltaic roofing system according to claim 1, wherein the one or more non-photovoltaic roofing elements disposed along the bottom end of the one or more bottom flashing elements are affixed to the roof deck by one or more fasteners, and the one or more fasteners are not overlapped by any of the photovoltaic roofing elements.

9. A photovoltaic roofing system according to claim 1, wherein part of the upward-facing surface of the one or more bottom flashing elements remains exposed.

10. A photovoltaic roofing system according to claim 1, further comprising an inverter operatively coupled to the plurality of photovoltaic roofing elements, or a plurality of microinverters disposed under the contiguously-disposed photovoltaic roofing elements, each microinverter being operatively coupled to one of more of the plurality of photovoltaic roofing elements.

11. A roof comprising a roof deck and a photovoltaic roofing system according to claim 1, disposed on the roof deck.

12. The photovoltaic roofing system according to claim 1, wherein the plurality of contiguously-disposed photovoltaic roofing elements are arranged in a plurality of vertically-overlapping rows, with the row of bottom end photovoltaic roofing elements being overlapped by a first course of photovoltaic roofing elements disposed up-roof from the row of bottom end photovoltaic roofing elements, and the first course of photovoltaic roofing elements being overlapped by a second course of photovoltaic roofing elements disposed up-roof from the first course of photovoltaic roofing elements, and the second course of photovoltaic roofing elements being overlapped by a third course of photovoltaic roofing elements disposed up-roof from the second course of photovoltaic roofing elements.

13. The photovoltaic roofing system according to claim 1, wherein the each of the bottom end photovoltaic roofing elements is not disposed over any of the plurality of non-photovoltaic roofing elements.

14. The photovoltaic roofing system according to claim 1, wherein no non-photovoltaic roofing elements are disposed between the contiguously-disposed photovoltaic roofing elements and the roof deck or the membrane or underlayment.

* * * * *